US010627931B2

(12) United States Patent
Chung

(10) Patent No.: US 10,627,931 B2
(45) Date of Patent: Apr. 21, 2020

(54) ROLLABLE MOBILE TERMINAL

(71) Applicant: LG ELECTRONICS INC., Seoul (KR)

(72) Inventor: Sooyon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/061,595

(22) PCT Filed: Dec. 16, 2015

(86) PCT No.: PCT/KR2015/013806
§ 371 (c)(1),
(2) Date: Jun. 12, 2018

(87) PCT Pub. No.: WO2017/104860
PCT Pub. Date: Jun. 22, 2017

(65) Prior Publication Data
US 2018/0364827 A1 Dec. 20, 2018

(51) Int. Cl.
*G06F 3/041* (2006.01)
*H04M 1/725* (2006.01)
(Continued)

(52) U.S. Cl.
CPC ............ *G06F 3/041* (2013.01); *G06F 1/1643* (2013.01); *G06F 1/1652* (2013.01);
(Continued)

(58) Field of Classification Search
None
See application file for complete search history.

(56) References Cited

U.S. PATENT DOCUMENTS

2010/0033435 A1 2/2010 Huitema
2010/0117975 A1* 5/2010 Cho .................. G06F 1/165
345/173

(Continued)

FOREIGN PATENT DOCUMENTS

KR 10-2014-0025231 A 3/2014
KR 10-2014-0112988 A 9/2014
KR 10-2015-0068823 A 6/2015

*Primary Examiner* — Carl Adams
(74) *Attorney, Agent, or Firm* — Birch, Stewart, Kolasch & Birch, LLP

(57) ABSTRACT

The present invention relates to a rollable mobile terminal having a rollable display, the rollable mobile terminal comprising: a touch screen formed to be rollable; a first body connected to one end of the touch screen; a second body connected to the other end opposite to the one end of the touch screen; a guide unit which is arranged at the first body and/or the second body, and is formed to wrap around the touch screen so as to accommodate thereof; and a control unit for setting at least a part of the touch screen, which is exposed to the outside of the guide unit by a movement, as a display region when the first body and/or the second body are moved by an external force, and outputting screen information to the display region, wherein the control unit outputs different pieces of the screen information to the display region on the basis of the body, which is moved by the external force, between the first body and the second body.

17 Claims, 29 Drawing Sheets

(51) Int. Cl.
*G06F 3/0488* (2013.01)
*G06F 1/16* (2006.01)
*H04M 1/02* (2006.01)

(52) U.S. Cl.
CPC .......... *G06F 1/1677* (2013.01); *G06F 1/1686* (2013.01); *G06F 3/0488* (2013.01); *G06F 3/04886* (2013.01); *H04M 1/0241* (2013.01); *H04M 1/0268* (2013.01); *H04M 1/725* (2013.01); *G06F 2203/04102* (2013.01); *H04M 1/72519* (2013.01); *H04M 2250/16* (2013.01); *H04M 2250/22* (2013.01)

(56) References Cited

U.S. PATENT DOCUMENTS

| | | | |
|---|---|---|---|
| 2012/0242610 A1 | 9/2012 | Yasumatsu | |
| 2013/0201208 A1* | 8/2013 | Cho | G06F 3/1431 345/619 |
| 2013/0234951 A1* | 9/2013 | Kim | G06F 1/1652 345/173 |
| 2014/0247229 A1* | 9/2014 | Cho | G06F 1/1616 345/173 |
| 2015/0268914 A1* | 9/2015 | Kim | G06F 3/1423 345/1.3 |

* cited by examiner

FIG. 2A
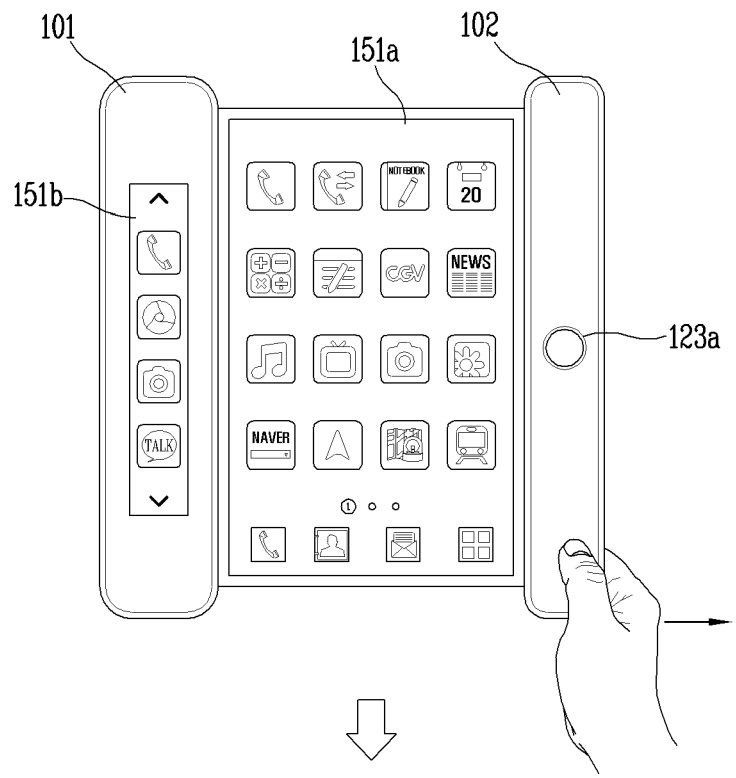
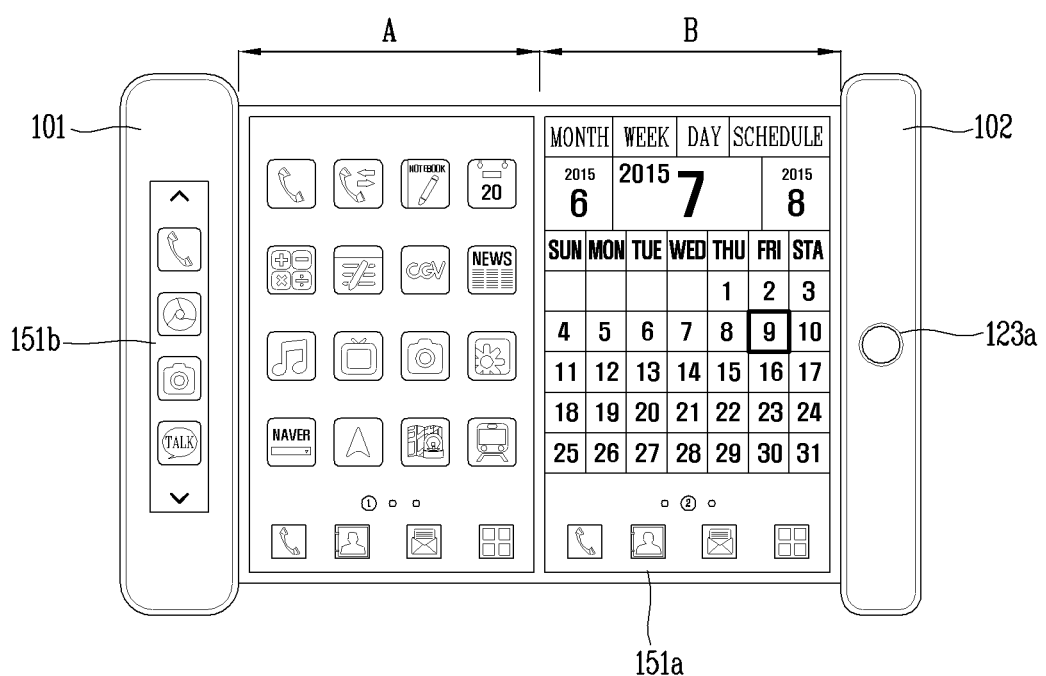

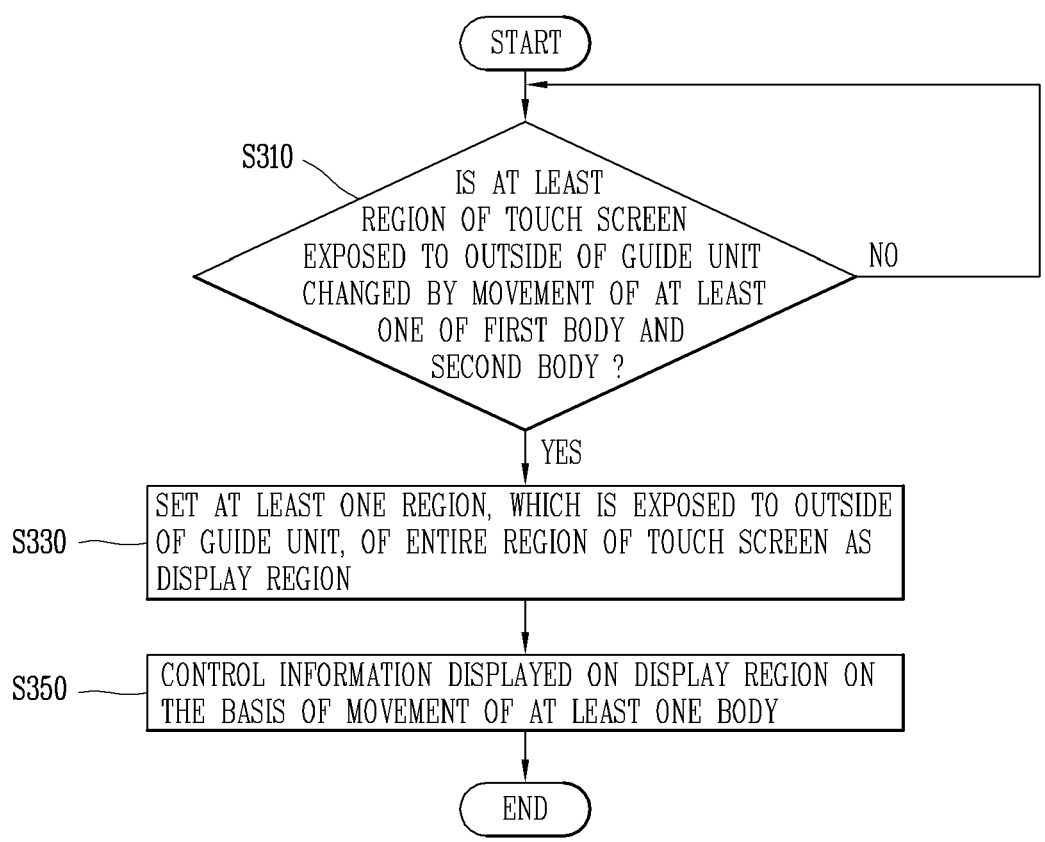

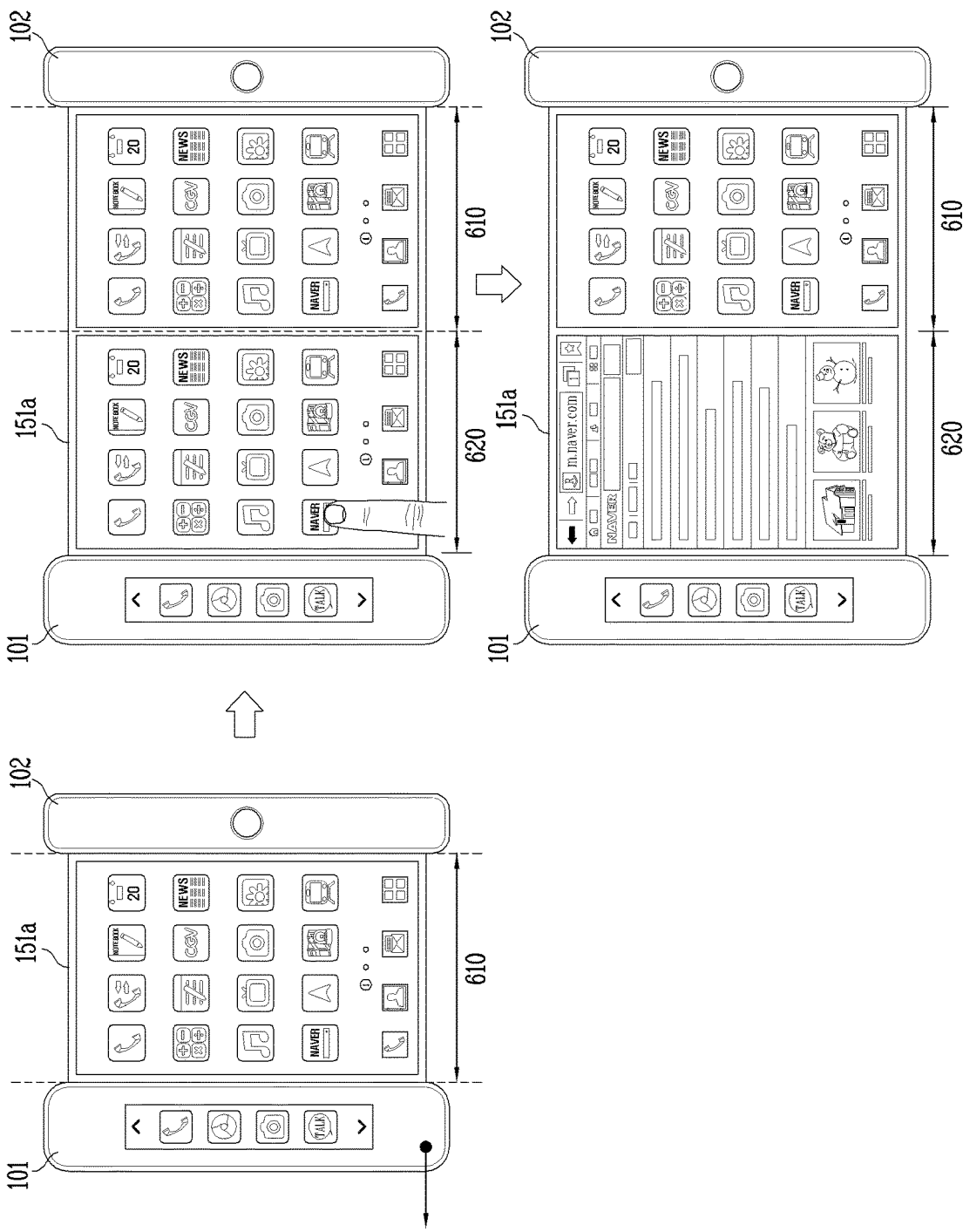

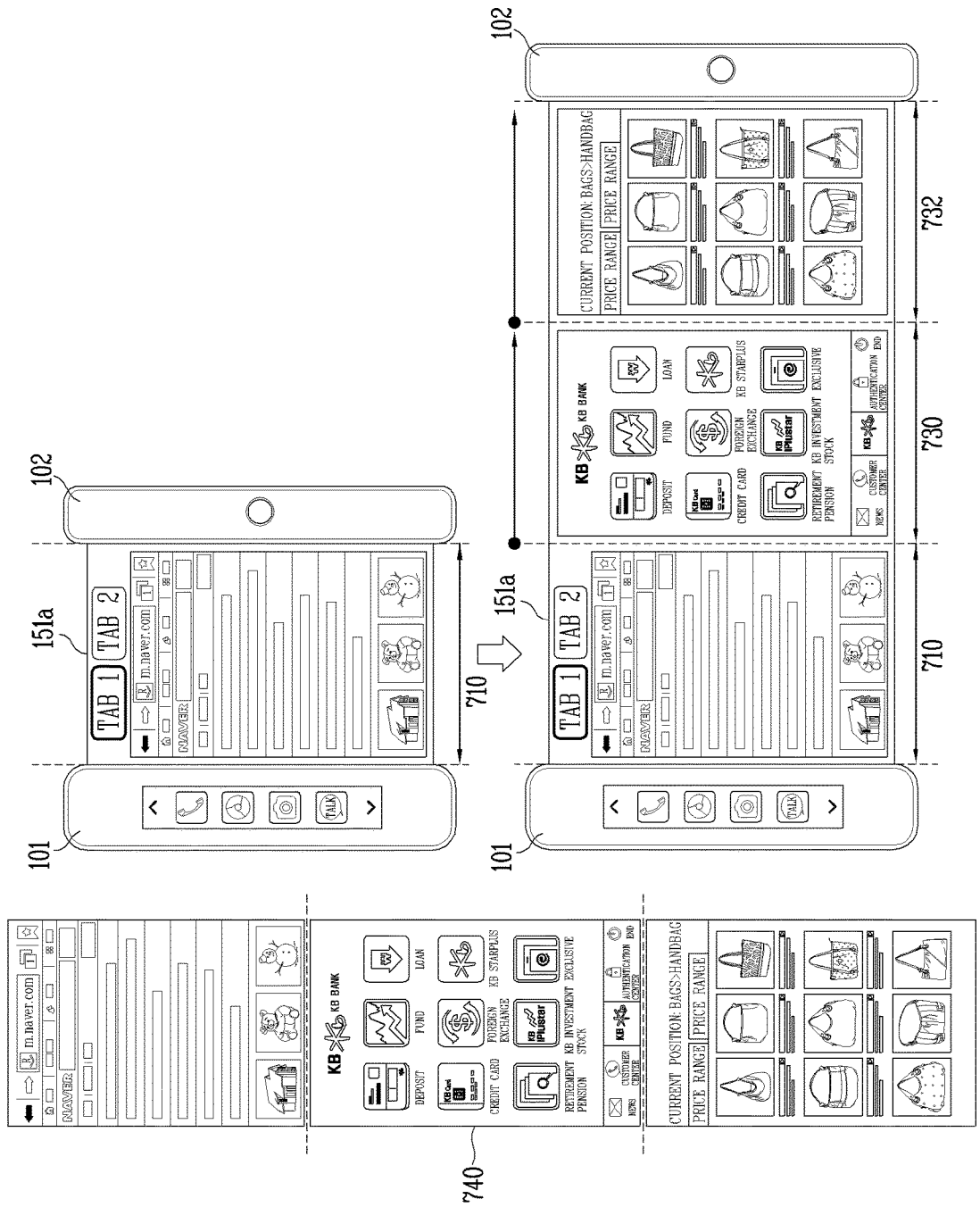

ROLLABLE MOBILE TERMINAL

CROSS REFERENCE TO RELATED APPLICATIONS

This application is the National Stage filing under 35 U.S.C. 371 of International Application No. PCT/KR2015/013806, filed on Dec. 16, 2015, which is hereby expressly incorporated by reference into the present application.

TECHNICAL FIELD

The present invention relates to a rollable mobile terminal having a rollable display, and a method of controlling the same.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

A display region of the related art mobile terminal is fixed and always has a fixed size. There is a problem that the mobile terminal having the fixed size is inconvenient to carry. In order to solve this inconvenience, along with development of display-related technologies, flexible display devices having flexibility and rollable display devices which can be curved and rolled have been researched and developed.

DISCLOSURE OF THE INVENTION

The present invention is directed to solving the aforementioned problems and other drawbacks.

Another aspect of the present invention is to provide a rollable mobile terminal that facilitates a user to adjust a display region.

Another aspect of the present invention is to provide a rollable mobile terminal capable of executing various functions, which are executable on a terminal, immediately by adjusting a display region, and a method of controlling the same.

To achieve those aspects and other advantages of the present invention, a rollable mobile terminal according to one embodiment of the present invention may include a touch screen configured to be rollable, a first body coupled to one end of the touch screen, a second body connected to another end opposite to the one end of the touch screen, a guide unit disposed on at least one of the first body and the second body to accommodate the touch screen in a rolling manner, and a controller to set, when at least one region, exposed to outside of the guide unit, of an entire region of the touch screen is changed by a movement of at least one of the first and second bodies, the at least one region as a display region, and controls information displayed in the display region based on the movement of the at least one body.

In one embodiment, the controller may control the touch screen to output different screen information in the display region according to the at least one body causing the movement when the closed state is switched to the open state by the movement of the at least one body.

In one embodiment, the controller may output first screen information in the display region when the closed state is switched to the open state by a movement of the first body, and output second screen information in the display region when the closed state is switched to the open state by a movement of the second body.

In one embodiment, the rollable mobile terminal may further include a memory to store first and second user accounts having different access rights to files stored in the terminal and functions executable in the terminal. The controller may log in the first user account when the closed state is switched to the open state by the movement of the first body, and log in the second user account when the closed state is switched to the open state by the movement of the second body. The first screen information may be a home screen page corresponding to the first user account, and the second screen information may be a home screen page corresponding to the second user account.

In one embodiment, the controller may output third screen information in the display region when the closed state is switched to the open state by a movement of the first body and the second body.

In one embodiment, the controller may reset at least one of the first to third screen information, preset to be output in the display region according to the movement of the at least one body, to another screen information based on a user input.

In one embodiment, the controller may execute one of functions associated with an application based on the movement of the at least one body when a second region of the touch screen is exposed by the movement of the at least one body while a first execution screen of the application is being output in a first region. The first execution screen may be displayed in the first region and a second execution screen corresponding to the one function may be displayed in the second region.

In one embodiment, the controller may execute a first function of the functions associated with the application when the second region is exposed by the movement of the first body and execute a second function of the functions associated with the application when the second region is exposed by the movement of the second body.

In one embodiment, the functions associated with the application may form a tree structure, the first function may correspond to a parent node based on the first execution screen, and the second function may correspond to a child node based on the first execution screen.

In one embodiment, the controller may execute a third function of the functions associated with the application when the second region is exposed by the movement of the first and second bodies.

In one embodiment, the controller may control the touch screen to output different screen information according to a size of the display region when the closed state is switched to the open state by the movement of the at least one body.

In one embodiment, the controller may control the touch screen to display a predetermined number of graphic objects in the display region when the size of the display region is smaller than a reference size, and to display a preset home screen page in the display region when the size of the display region is larger than the reference size.

In one embodiment, the preset home screen page may be changed according to the movement of the at least one body, by which the closed state has been switched to the open state.

In one embodiment, the controller may control the touch screen to display graphic objects included in a first group in the display region when the closed state is switched to the open state by the movement of the first body and the size of the display region switched to the open state is smaller than the reference size, and control the touch screen to display graphic objects included in a second group in at least one region switched to the open state when the closed state is switched to the open state by the movement of the second body and the size of the display region switched to the open state is smaller than the reference size.

In one embodiment, the controller may control the touch screen to display at least part of a first window in the display region when the size of the display region is smaller than a reference size, and to display the first window and at least part of a second window in the display region when the size of the display region is larger than the reference size. The first and second windows may be displayed in different regions of the display region and include different screen information.

In one embodiment, the controller may detect a control command related to information displayed in the first window using a touch input applied to the first window, and detect a control command related to information displayed in the second window using a touch input applied to the second window.

In one embodiment, the rollable mobile terminal may further include a sensing unit to detect the movement of the at least one body, and detect at least one region, exposed to the outside of the guide unit, of the entire region of the touch screen, and the controller may set the detected at least one region as the display region in response to the movement of the at least one body.

In one embodiment, when a second region of the touch screen is exposed by the movement of the at least one body while screen information is being output in a first region of the touch screen in the open state and the movement of the at least one body satisfies a preset condition, the controller may control the touch screen to display at least part of the screen information being output in the first region in the second region.

In one embodiment, the controller may output screen information in a first region of the touch screen and move the screen information on the first region such that information to be output is sequentially displayed according to a direction of a preset touch applied to the touch screen. The controller may control the touch screen such that another part, different from the part being output in the first region, of the information to be output is output in a second region of the touch screen when the second region is exposed by the movement of the at least one body.

In one embodiment, when the display region is changed from a first region to a second region due to the movement of the first and second bodies, the controller may display screen information displayed in the first region in the second region, and increase or decrease a size of content included in the screen information based on a size of the second region.

Effects of the Invention

Hereinafter, effects of a rollable mobile terminal according to the present invention will be described.

According to the present invention, when a display region of a rollable mobile terminal is opened to the left or right or to the left and right, a different function can be executed according to an opening manner, and accordingly different screen information can be displayed in the display region. A user can directly access various functions by changing a manner of adjusting the display region. Accordingly, the rollable mobile terminal provides a new user interface for generating a control command using roll-in or roll-out, taking an extract step from a manner of generating a control command using a touch.

The effects obtained by the present invention are not limited to the effects mentioned above, and other effects not mentioned can be clearly understood by those skilled in the art from the following description will be.

BRIEF DESCRIPTION OF THE DRAWINGS

FIGS. 1A, 1B, 1C and 1D are conceptual views illustrating a rollable mobile terminal in accordance with one embodiment of the present invention.

FIGS. 2A and 2B are conceptual views illustrating a rollable mobile terminal on which a plurality of screen information is output.

FIG. 3 is a flowchart illustrating a control method in accordance with the present invention.

BEST MODE OF THE INVENTION

Figure 1A:
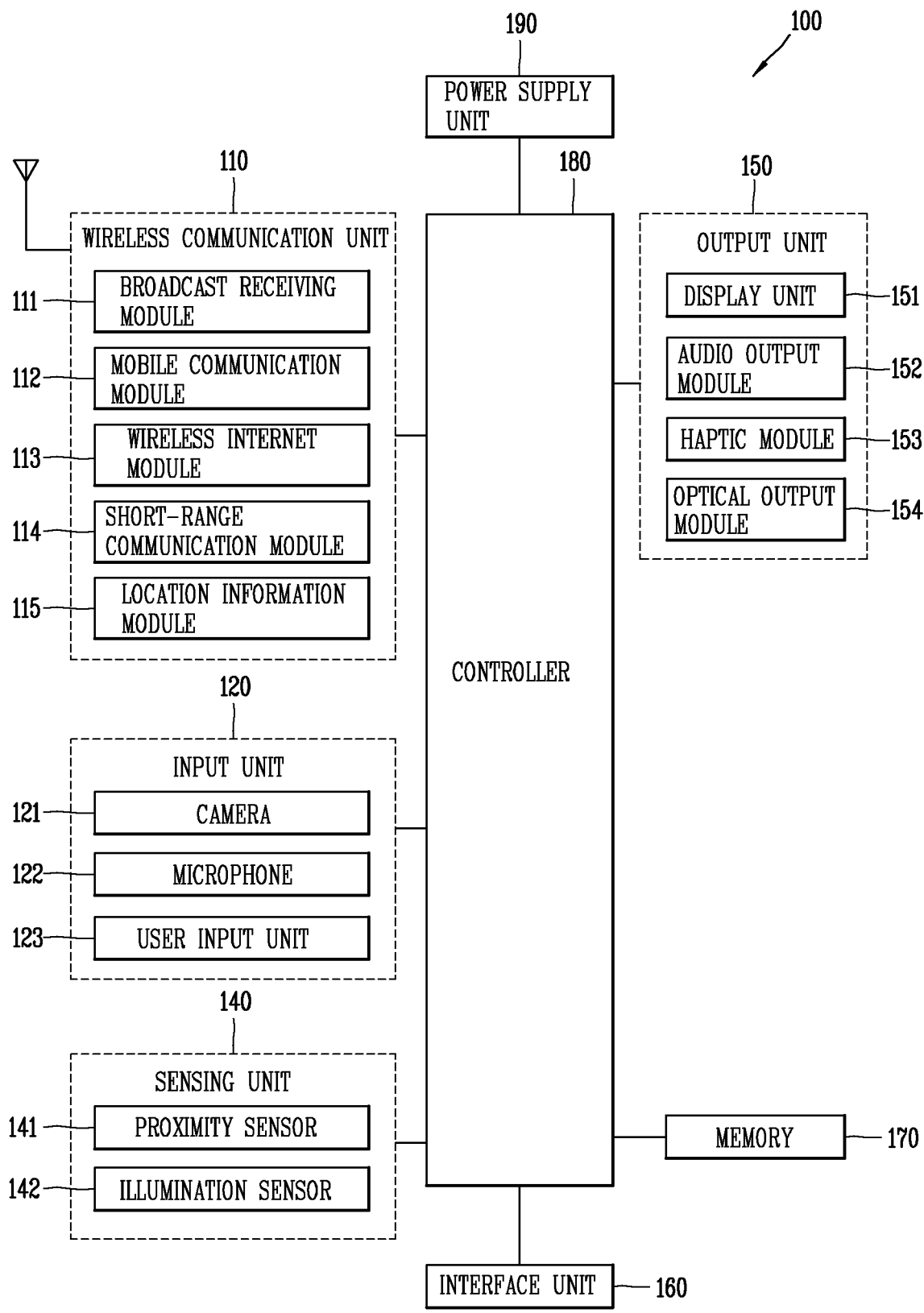
FIG. 1A is a block diagram of a mobile terminal in accordance with one exemplary embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
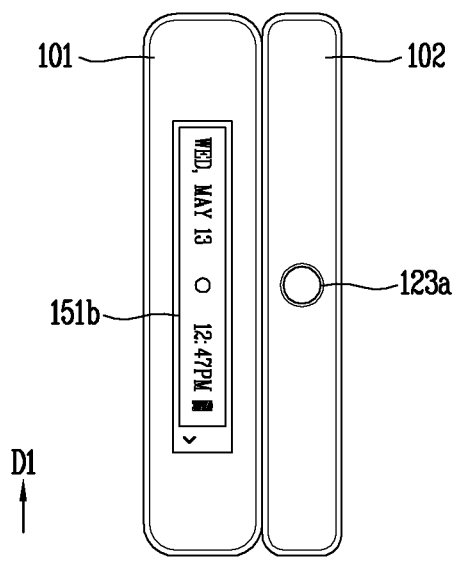
Figure 1C:
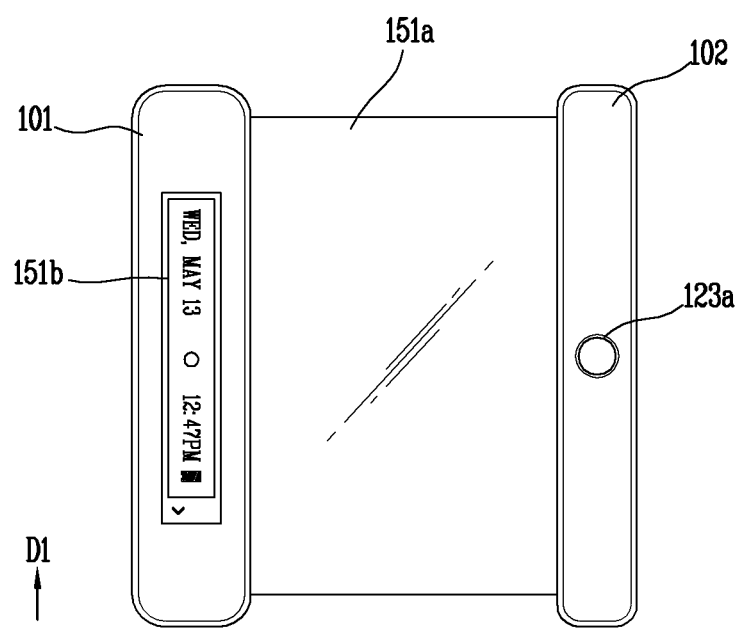

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases forms an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia playback sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the electronic device 100. Another example of the accessory may be a touch pen for assisting or extending a touch input onto a touch screen.

The display unit 151 described above may be configured to be deformable by an external force. The deformation may be at least one of curving, bending, folding, twisting, and rolling of the display unit 151. The deformable display unit 151 may be referred to as 'flexible display unit'. Here, the flexible display unit may include a typical flexible display, electronic paper (e-paper), and a combination thereof.

The typical flexible display refers to a durable display that is lightweight and does not break easily by being fabricated on a thin, flexible substrate, such as paper, which is bent, curved, folded, twisted or rolled while maintaining characteristics of an existing flat panel display.

In addition, the electronic paper is a display to which general ink characteristics are applied, and is different from the existing flat panel display in view of using reflected light. The electronic paper may change information by using a twist ball or electrophoresis (electrophoresis) using a capsule.

In a state where the flexible display unit is not deformed (e.g., a state having an infinite radius of curvature, hereinafter, referred to as a first state), a display region of the flexible display unit is flat. When the first state is switched to a state where the flexible display unit is deformed by an external force (e.g., a state having a finite radius of curvature, hereinafter, referred to as a second state), the display region may be curved. As illustrated in the drawing, information displayed in the second state may be visual information output on a curved surface. Such visual information is realized by independently controlling an emission of sub-pixels arranged in a matrix form. The sub-pixel indicates a minimum unit for realizing one color.

At least a portion of the flexible display unit may be placed in a curved state (e.g., curved up or down or to left or right), other than a flat state, in the first state. In this case, if an external force is applied to the flexible display unit, the flexible display unit may be deformed into a flat state (or a less curved state) or a more curved state.

Meanwhile, the flexible display unit may be combined with a touch sensor to implement a flexible touch screen. When a touch is applied to the flexible touch screen, the controller 180 (see FIG. 1A) may perform a control corresponding to the touch input. The flexible touch screen may be configured to sense a touch input in the second state.

Meanwhile, the mobile terminal 100 according to this variation example may be provided with a deformation detecting unit to detect the deformation of the flexible display unit. The deformation detecting unit may be included in the sensing unit 140 (see FIG. 1A).

The deformation detecting unit may be provided on the flexible display unit or the case so as to detect information related to the deformation of the flexible display unit. Here, the information related to the deformation may be a deformed direction of the flexible display unit, a deformed degree, a deformed position, a deformed time, and an acceleration at which the deformed flexible display unit is restored. In addition, the deformation-related information may be various information which can be detectable due to the flexible display unit being curved.

When the flexible display unit is accommodated in a manner of being rolled into the terminal, the deformation detecting unit may detect at least one region, which is exposed to the outside of the terminal, of an entire region of the flexible display unit.

In addition, the controller 180 may change information displayed on the flexible display unit or generate a control signal for controlling the function of the mobile terminal 100 based on the deformation-related information of the flexible display unit detected by the deformation detecting unit.

Meanwhile, the mobile terminal 100 according to this variation example may include a case for accommodating the flexible display unit. The case may be deformable together with the flexible display unit 251 by an external force in consideration of the characteristics of the flexible display unit.

In addition, a battery (not illustrated) included in the mobile terminal 200 may be deformable together with the flexible display unit by an external force, taking into account the characteristics of the flexible display unit. In order to implement the battery, a stack & folding type in which battery cells are stacked up may be applied.

The state change of the flexible display unit is not limited to the case caused by the external force. For example, when the flexible display unit is in the first state, the first state may be changed to the second state by a command of a user or an application.

The mobile terminal according to the present invention may have a rollable display unit which is accommodated therein in a rolled state. The user can expose or accommodate the display unit by applying an external force to the mobile terminal.

FIGS. 1A, 1B, 1C and 1D are conceptual views illustrating a rollable mobile terminal in accordance with one embodiment of the present invention.

Figure 1D:
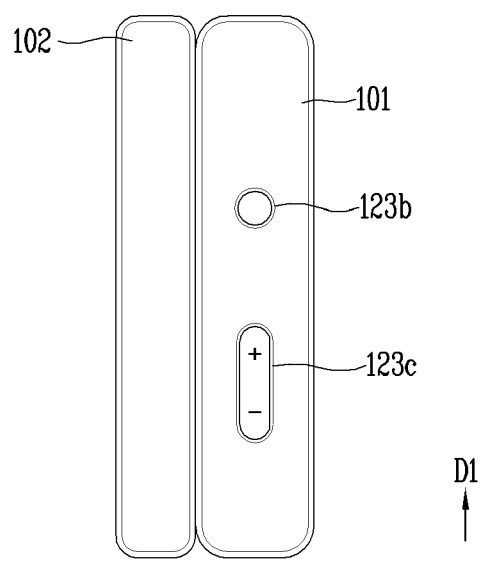

FIG. 1B is a front view illustrating a mobile terminal in a closed state in which a first touch screen 151a is accommodated in a body portion. FIG. 1C is a front view of the mobile terminal in an open state in which the first touch screen 151a is exposed from the body portion, and FIG. 1D is a rear view in the closed state.

Referring to FIGS. 1B and 1C, the mobile terminal 100 according to the present invention may include first and second bodies 101 and 102, first and second touch screens 151a and 151b, and a first user input unit 123a.

The mobile terminal 100 of the present invention includes first and second bodies 101 and 102. The first and second bodies 101 and 102 extend in a first direction D1 and are spaced apart from each other based on tension applied in a direction intersecting the first direction D1.

One surface of the first body 101 and one surface of the second body 102 may be in contact with each other in a closed state. The first and second bodies 101 and 102 may extend in the first direction D1 to have the substantially same length. For example, the one surface of the first body 101 may have a shape corresponding to that of the one surface of the second body 102.

As illustrated in FIG. 1B, in the closed state, the first touch screen 151a may be accommodated in at least one of the first and second bodies 101 and 102 and may not be exposed accordingly. This is to prevent the first touch screen 151a from being damaged by an external environment.

Further, the user may freely adjust the size of the terminal according to a use environment by using rollable characteristic of the terminal. The size of the terminal may be reduced by accommodating the first touch screen 151a to facilitate the terminal to be carried or an entire region of the first touch screen 151a may be exposed to allow the use of a large display.

Hereinafter, for the sake of explanation, the foregoing description has been given of the embodiment in which the first touch screen 151a is accommodated in at least one of the first and second bodies 101 and 102 in the closed state, but the present invention is not limited thereto. As another example, in the closed state, a predetermined region of the first touch screen 151a may alternatively be exposed without being accommodated in the first and second bodies 101 and 102. In this case, the user can check information related to an event occurring in the mobile terminal through the predetermined region even in the closed state.

The first body 101 and/or the second body 102 of the mobile terminal 100 include a guide unit for guiding the first touch screen 151a so as to be accommodated in a rolling manner. When the guide unit is provided in the first body 101, the guide unit extends along the first direction D1, and includes an accommodation space for accommodating a stylus pen (not illustrated) therein.

The mobile terminal 100 may further include a stylus pen accommodated in the first body 101. The stylus pen may extend along the first direction D1 and be accommodated in the first body 101 along the first direction D1. The stylus pen is detachable from the first body 101 based on the user's external force.

An end portion of the stylus pen may be exposed to the outside of the first body 101 in a state of being accommodated in the stylus pen. The user may apply a force to the stylus pen exposed from the first body 101 to separate the stylus pen from the first body 101.

One end portion of the first touch screen 151a is fixed to the first body 101 to be rollable by the guide unit, and another end portion of the first touch screen 151a is fixed to the second body 102. When a distance between the first and second bodies 101 and 102 is shortened, the first touch screen 151a is rolled by the guide unit to be gradually accommodated into the first body 101.

The first and second bodies 101 and 102 are spaced apart from each other based on a tensile force applied in the direction intersecting the first direction D1, and the first touch screen 151a is exposed between the first and second bodies 101 and 102. As the first and second bodies 101 and 102 are distant from each other due to the external force, the exposed region of the first touch screen 151a increases.

The first body 101 may include a transparent portion (not illustrated) made of a transparent material so that a part of the first touch screen 151a is reflected. The transparent portion may allow an image, which is output on one region of the first touch screen 151 accommodated in the first body 101, to be viewed.

The first touch screen 151a may be formed integrally with a touch sensor unit for receiving a user's touch input. Accordingly, a touch sensor included in the first touch screen 151a can sense a touch input applied through the transparent portion. An independent touch sensor may be provided on the transparent portion.

The first touch screen 151a may be formed integrally with a touch sensor unit for receiving the user's touch input. Accordingly, the touch sensor included in the first touch screen 151a can sense a touch input applied through the transparent portion. For example, in the closed state, the controller may control current status information (a current time, a current position, a date of today, etc.) related to the mobile terminal 100, information related to a received event, and the like to be displayed on one region of the first touch screen 151a corresponding to the transparent portion. At this time, the remaining region except for the one region of the first touch screen 151a corresponding to the transparent portion may be kept off in the closed state. This may result in preventing unnecessary power consumption.

When the transparent portion is provided, the user can visually see at least one region of the first touch screen 151a through the transparent portion. Alternatively, as illustrated in FIG. 1B, a second touch screen 151b may be provided on the first body 101, instead of the transparent portion.

The second touch screen 151b may include at least one of status information related to the mobile terminal 100 and an icon of a preset application. The status information related to the mobile terminal 100 may include at least one of antenna information, communication mode information, battery information, occurred event information, information on a set function, time information, and weather information in relation to the mobile terminal 100. The preset application may include at least one of an icon corresponding to a specific application and a widget, preset by the user's selection or the controller 180.

The second touch screen 151b may include at least one of a liquid crystal display (LCD), a thin film transistor-LCD (TFT LCD), an organic light-emitting diode (OLED), a flexible display, a three-dimensional (3D) display, and an e-ink display.

In the closed state, the first touch screen 151a may be accommodated in at least one of the first and second bodies 101 and 102, and the second touch screen 151b may display thereon the status information related to the mobile terminal 100.

Referring to FIG. 1C, one end portion of the first touch screen 151a is fixed to the first body 101 and another end portion of the first touch screen 151a is fixed to the second body 102. Accordingly, the user can grasp and pull the first and second bodies 101 and 102 by hands to expose the display unit which is accommodated in at least one of the first and second bodies 101 and 102 in the rolled manner.

Hereinafter, at least one region, which is externally exposed, of the entire region of the first touch screen 151a to allow the user to check visual information, is defined as a 'display region', and the other region excluding the display region is defined as a 'remaining region'.

The controller 180 may detect at least one of the display region and the remaining region using the sensing unit 140 or the deformation detecting unit. On the basis of the detection result, the controller 180 may control the first touch screen 151a such that the display region outputs screen information in a power-on state and the remaining region is kept in a power-off state.

The display region displays (outputs) thereon information processed in the mobile terminal 100 in the open state. For example, the display region may display thereon execution screen information of an application program executed on the mobile terminal 100 or user interface (UI) and graphic user interface (GUI) information according to the execution screen information.

Meanwhile, each of the first and second touch screens 151a and 151b may include a touch sensor for sensing a touch input applied to the touch screen so as to receive a control command applied in a touch manner. Accordingly, when a touch is applied to the touch screen, the touch sensor may sense the touch, and the controller 180 may generate a control command corresponding to the touch. Contents input in the touch manner may be characters, numbers, instructions in various modes, or menu items that can be specified.

On the other hand, the touch sensor may be configured in a form of a film having a touch pattern and disposed between a window 151a and a display (not illustrated) on a rear surface of the window or may be a metal wire directly patterned on the rear surface of the window. Alternatively, the touch sensor may be formed integrally with the display. For example, the touch sensor may be disposed on a substrate of the display or may be provided inside the display.

In this way, the display unit 151 illustrated in FIG. 1A may realize a touch screen together with the touch sensor, and in this case, the touch screen may function as the user input unit (123, see FIG. 1A). In some cases, the touch screen may replace at least some of functions of the user input unit.

Meanwhile, the second body 102 is provided with the first user input unit 123a. However, the present invention may not be limited to this, and the position of the first manipulation unit 123a may be changeable.

The first user input unit 123a receives a control command for the first touch screen 151a. More specifically, when a push input is applied to the first touch screen 151a in the open state, the first touch screen 151a is switched into an activated (or active) state. That is, the first user input unit 123a may be a home button for turning on/off the first touch screen 151a.

The first user input unit 123a includes a button disposed on the front of the second body to receive a push input, and a finger scanner disposed to overlap the button to recognize a fingerprint of a finger that is in contact with the button.

The button is externally exposed from the front of the terminal and is configured to receive a push input of a first function. The first function may be a function of causing preset screen information to be displayed on the display region. In another example, when a user applies a push input to the button while a web page screen is displayed on the display region, the web page screen of the display region may be switched to a home screen page. In another example, when a home screen page is output to the first touch screen 151a and the home screen page is in plurality, the home screen pages may be switched by a push input applied to the button.

The first user input unit 123a may be configured to scan both the push input and a fingerprint of a finger of the user applying the push. More specifically, a finger scan module is mounted on one surface of the button (an upper surface in this example) to scan a fingerprint of a finger which is in contact with the button. The button is slidable by the pushing, thereby pressing a switch. When the switch is pressed, the controller detects the push input and processes a corresponding control command.

However, the present invention is not necessarily limited to this example. For example, the push button may be replaced with a touch button. More specifically, the finger scan module may be disposed on an upper surface of the touch button. Therefore, in the example described below, the push input through the push button may be replaced with a touch input through the touch button.

The finger scan module may be utilized as a function key related to power on/off. For example, if the button of the first user input unit 123a is pushed while the terminal is powered off, power is supplied to the finger scan module to perform finger scanning. The terminal determines whether the scanned fingerprint matches a prestored fingerprint of the user, and if matching each other, power-on and terminal booting are continuously carried out. As described above, since the power-on command of the terminal is made in two stages (the power-on of the finger scan module and the power-on of the terminal), consumed currents can be further reduced. That is, a security function according to the finger scanning is given to the power-on operation, but the finger scan module can be turned off together with the terminal body instead of being continuously turned on.

Further, since this case corresponds to a case where the user turns on the terminal, when the power-on and the terminal booting are completed, the display region may directly enter a home screen page without opening a lock screen.

In addition, if the scanned fingerprint does not match the user's fingerprint, the power-on and the terminal booting are interrupted. In this case, the terminal may output a warning message indicating that the scanned fingerprint is not the user's fingerprint. The warning message may be, for example, given a lighting effect on the front surface of the terminal or outputting an effect sound for a predetermined period of time.

As another example, in a lock mode in which the lock screen is output to the display region, when a push input is applied to the first user input unit 123a, a lock state may be released and the lock screen may be switched to a home screen page. In this case, the first user input unit 123a may be a hot key for releasing the lock state.

However, the release of the lock state is performed only when the finger scanning is performed with respect to an object brought into contact with the finger scan module in the pushing manner and the scanned fingerprint matches the prestored user's fingerprint. During the finger scanning, a notification message indicating that the finger scanning is being performed may be output on the second touch screen 151b of the terminal.

In view of the characteristics of the rollable mobile terminal, the first body 101 and the second body 102 may move in a direction away from each other or move toward each other by a user gesture.

For example, the first and second bodies 101 and 102 are spaced apart from each other based on a tensile force applied in a direction intersecting with the first direction D1 in the lock state, and the first touch screen 151a is exposed between the first and second portions 101 and 102. An operation in which at least one region of the first touch screen 151a which has been accommodated in the guide unit is exposed to the outside of the guide unit is defined as 'roll-out' (or a roll-out operation). The closed state may be switched to the open state by the roll-out.

On the other hand, when the first body 101 and the second body 102 move toward each other, the at least one region of the first touch screen 151a, which has been exposed out of the guide unit, is accommodated into the guide unit. This operation is defined as 'roll-in'. The open state may be switched to the closed state by the roll-in.

When the closed state is switched to the open state, the controller 180 determine whether or not to release the lock state in response to the finger scan module scanning the user's fingerprint.

When the scanned fingerprint is not present or does not match a prestored fingerprint of the user, the controller 180 outputs on the display region a lock screen for receiving a password to unlock the lock state while maintaining the lock state. The password may be a password set by the user or set in various forms such as a pattern and the like.

When the lock screen is displayed on the display region, guidance information indicating that the lock state is being maintained and notifying necessity to perform the finger scanning may be output to the second touch screen 121b. In the state that the lock screen is output (or in the lock mode), the first touch screen 151a may be in a state in which only a touch input related to the operation of unlocking the lock state can be applied. The operation of unlocking the lock state may be an operation of inputting a pattern or a password set by the user.

On the other hand, when the scanned fingerprint matches the prestored fingerprint of the user, the controller 180 switches the lock state to the unlock state and outputs a home screen page to the display region. The second touch screen 121b may output guidance information for notifying that the finger scanning has been successfully performed.

Here, the home screen page may also be referred to as an idle screen and may be in a state of allowing a touch input with respect to the display region. In this case, the first user input unit 123a may be a hot key for unlocking the lock state.

The home screen page may be output on the display unit 251 when the terminal is in an idle state. More specifically, an icon or a widget of an application installed in the mobile terminal may be displayed on the home screen page. Further, the home screen page may be provided in plurality according to a user selection or the number of applications installed in the terminal.

As such, switching to the home screen page may be carried out in a manner of returning from a state where a specific application is being executed, other than the lock mode, into the home screen page. For example, while a web page is output on the display region, when pushing the first user input unit 123a, the web page may be returned to the home screen page. That is, the first user input unit 123a may operate as a home key for performing a control command to return to the home screen page.

The display region which has been turned off is turned on by the roll-out to display screen information, but the lock state is released or maintained according to whether a fingerprint matching the prestored user's fingerprint is scanned on the first user input unit 123a. Thus, the user can control the rollable terminal to output different screen information when the roll-out is performed.

Meanwhile, when the lock state is released in the open state, a plurality of icons related to execution of different applications may be displayed on the second touch screen 151b. In other words, when the home screen page is displayed on the display region, the controller 180 may output a plurality of icons to the second touch screen 151b.

The plurality of icons may be associated with applications selected by the user or executed recently. When the plurality of icons is related to applications preset by the user, types of the preset applications may be reset by a user input.

When a touch is applied to one of the plurality of icons in the open state, the controller 180 executes an application corresponding to the one icon and outputs an execution screen of the application on the display region. For example, when a touch is applied to any one of the icons displayed on the second touch screen 151b while a home screen page is output to the display region, the home screen page is switched to an execution screen of the application corresponding to the one icon.

When the execution screen is output on the display region, the icons disappear from the second touch screen 151b and graphic objects corresponding to functions related to the application are displayed on the second touch screen.

As the roll-out is performed in the closed state, the display region is changed from a vertically-long rectangular shape to a horizontally-long rectangular shape. In case where the user grasps the terminal using the first and second bodies 101 and 102, when a graphic object is displayed at a center of the display region, it is difficult for the user to apply a touch input to the graphic object. In order to prevent such inconvenience, when an execution screen is displayed on the display region, the rollable mobile terminal according to the present invention may display at least one of the graphic objects, which is to be included in the execution screen, on the second touch screen 151b other than the display region (or on both the display region and the second touch screen 151b in a duplicating manner) This may allow the user to execute a function associated with an execution screen by using a hand holding the terminal.

The second touch screen 151b may serve as an information provider for providing simple information in the lock state. The second touch screen 151b may provide a preset icon for allowing a quick execution or an interface for controlling screen information currently output on the display region in the open state.

According to the present invention, since the first and second touch screens 151a and 151b operate in conjunction with each other, the mobile terminal can effectively output information necessary for the user.

On the other hand, when the open state is switched to the lock state by the roll-in in the unlock state, the controller 180 locks the terminal. That is, the controller 180 switches the terminal to the lock state.

Referring to FIG. 1D, second and third user input units 123b and 123c may be disposed on the rear surface of the mobile terminal. More specifically, the second and third user input units 123b and 123c may be disposed on the rear surface of the first body 101.

However, these components may not be limited to the arrangement. Some components may be omitted or rearranged or located on different surfaces. For example, the second user input unit 123b may be provided on a side surface of the first body 101 other than the rear surface, and the third user input unit 123b may be provided on the rear surface of the second body 102 other than the first body 101.

The power-on/off of the terminal itself may be performed by the second user input unit 123b. For example, a power-on/off, a function associated with an activation of the second touch screen 151b in the closed state, or a function associated with an activation of the first and second touch screens 151a and 151b in the open state may be executed by a push input applied to the second user input unit 123b. That is, the second user input unit 123b may serve as a power key of the terminal.

And the third user input unit 123b may serve as a volume key. More specifically, the third user input unit 123b is formed along a lengthwise direction of the first body 101 and exposed to the rear surface of the terminal body. The third user input unit 123b includes keys arranged on upper and lower portions, respectively, and receives a push input with respect to a function associated with a volume adjustment for sound output from the terminal body.

Although not illustrated, the components described in FIG. 1A may be provided on any one of the front, side, rear, and interior of the terminal body. For example, a first camera may be disposed on the rear surface of the first body 101, and a second camera may be disposed on the rear surface of the second body 102.

The foregoing description has been given of the structure of the rollable mobile terminal. Hereinafter, a control operation according to the structure of the rollable mobile terminal will be described in detail.

Referring to FIG. 2A, in the open state, a home screen page may be output on the display region and preset icons may be output on the second touch screen 151b.

When the home screen page includes a plurality of pages, at least one of the plurality of pages is displayed on the display region. At this time, the controller decides a number of pages to be displayed on the display region based on a size of the display region. For example, when the display region is smaller than a reference size, a first page corresponding to one of the plurality of pages may be output. On the other hand, when the display region is larger than or equal to the reference size, the first page and a second page of the plurality of pages may be output. In other words, one page may be output when the display region is smaller than the reference size, and at least two pages may be output when the display region is larger than or equal to the reference size.

The display region differs according to the roll-in or the roll-out. The rollable mobile terminal 100 is provided with the sensing unit 140 (see FIG. 1) and measures at least one of the display region and the remaining region using the sensing unit 140. Then, the number of pages to be displayed on the display region is decided according to the measurement result.

For example, as illustrated in FIG. 2A, when the display region is increased to be larger than the reference size due to the roll-out operation while one page is displayed, two or more different pages may be output to the display region based on the size of the display region.

In this case, the controller 180 may divide the display region into different regions based on the size of the display region and output the different pages on the divided regions. For example, when the number of pages to be output is decided as two pages, the display region is divided into first and second regions A and B, and a first page is output to the first region A and the second page to the second region B.

The first and second regions A and B may be used as windows that operate independently. Specifically, when a touch input is applied to the first region A, screen information currently output in the first region A is switched to another screen information while screen information currently output in the second region B is continuously output.

More specifically, when the display region is increased to be larger than the reference size while the first window is displayed in the first region A, screen division for the display region is carried out. The display region having the size larger than the reference size is divided into the first and second regions A and B. Then, the first region A is a first window and the second region B is a second window.

A touch input applied to the first region A (or the first window) generates a control command related to screen information displayed on the first window and switches the screen information output in the first region A into another screen information. On the other hand, a touch input applied to the second region B (or the second window) generates a control command related to screen information displayed on the second window and switches the screen information to another screen information. That is, a touch input applied to one of a plurality of windows being output on the display region generates a control command for the one of the windows and does not affect the other windows.

Accordingly, an execution screen of a first application among a plurality of applications executable in the terminal may be displayed on the first region A (or the first window) and an execution screen of a second application among the plurality of applications may be displayed on the second region B (or the second window).

The term 'window' may refer to a region, on which one of a plurality of user interfaces operates independently, of an entire region of the touch screen. For example, a first region may be referred to as a first window when a first user interface is displayed on the first region, and a second region may be referred to as a second window when a second user interface is displayed on the second region.

Figure 2B:
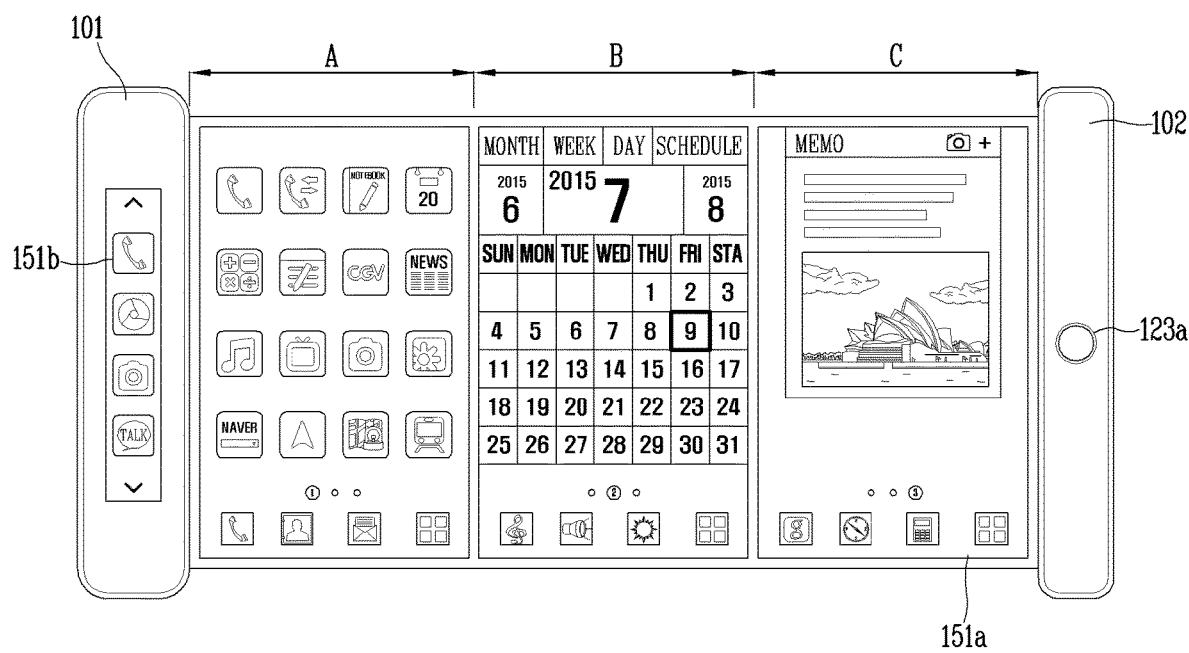

Referring to FIG. 2B, the controller 180 decides a number of windows to be displayed on the display region according to the size of the display region, and outputs one or more windows according to the decided number of windows.

The size of the display region may be decided by a distance between the first body 101 and the second body 102. Since one end of the touch screen is connected to the first body 101 and another end of the touch screen is connected to the second body 102, a vertical length of the display region is fixed. Accordingly, the size of the display region is decided by a horizontal length of an externally-exposed portion of the touch screen of an entire horizontal length of the touch screen.

The controller 180 may classify a display state into at least two states based on the horizontal length of the display region. For example, when the horizontal length (width: W) of the display region is within a first range (0<W≤a), the controller 180 may determine this display state as a first state. When the width W of the display region is within a second range (a<W≤b), the controller 180 may determine it as a second state. Also, when the width W of the display region is within a third range (b<W≤max), the controller 180 may determine it as a third state. However, the first to third states are merely illustrative, and the display state may be classified into at least two states according to the entire horizontal length (width) of the touch screen.

The controller 180 may output a first window in the first state, output first and second windows in the second state, and output first to third windows in the third state.

For example, a region where the first to third windows are output may be fixed of the entire region of the touch screen. For example, as illustrated in FIG. 2B, the first window is output in a portion (first region or A) having a width from 0 to a in the touch screen, the second window is output in a portion (second region or B) having a width from a to b, or B), the second window is output, and the third window is output in the portion (third region or C) from b to c. If the width W of the display region is within the second range, the first window is output in the portion A from 0 to a, and the second window is output in the portion (at least part of B) from a to W. In this case, the user may appropriately adjust the display region to use by performing the roll-out or roll-in operation while checking a boundary line between the windows.

In another example, the output regions for the first to third windows may vary according to the display region. If the width W of the display region is within the second range, the controller 180 displays the first and second windows in a manner of diving the display region into two parts and outputting the first and second windows in the divided different parts, respectively. Since the size of at least one window varies according to the size of the display region, the user can be provided with an interface optimized for the display region.

On the other hand, when a home screen page includes a plurality of pages, different pages of the plurality of pages may be preset to the windows output in the display region. For example, a first page may be preset to the first window, a second page may be preset to the second window, and a third page may be preset to the third window. When a home button is pressed, a preset page is displayed instead of currently-output screen information. In this case, the first page is displayed in the first window and the second page is displayed in the second window.

On the other hand, when the roll-out occurs, the closed state may be switched to the open state or the display region may be changed from the first region to the second region. In other words, the display region in which the screen information can be displayed is changed by the roll-out.

When the display region is changed by the roll-out, the controller 180 may selectively output different screen information according to a manner in which the roll-out occurs in the changed display region.

Further, when there is information output before the roll-out occurs, the controller 180 may selectively output different pieces of screen information based on at least one of the information output before the roll-out occurs and the manner in which the roll-out occurs.

Here, the manner in which the roll-out occurs may be defined by a movement of at least one of the first and second bodies 101 and 102 (see FIG. 1B).

The manner in which the roll-out occurs will be described under assumption that the user grasps the first body 101 with his/her left hand and the second body 102 with his/her right hand.

A first manner or type roll-out may be defined as the first body 101 moving away from the second body 102 while the second body 102 is fixed. When the user pulls out the left hand holding the first body 101 in a state of grasping the second body 102 with the right hand, the first type roll-out occurs. According to the first manner, as the first body 101 moves away from the second body 102, more regions of the touch screen 151 are included in the display region.

A second manner or type roll-out may be defined as the second body 102 moving away from the first body 102 in a state where the first body 101 is fixed. When the user pulls out the right hand holding the second body 102 in a state of grasping the first body 101 with the left hand, the second type roll-out occurs.

A third manner or type roll-out may be defined as the first and second bodies 101 and 102 moving away from each other. When the display region is opened with both hands, the third type roll-out occurs.

The three manners may also be applied to the roll-in. More specifically, a roll-in occurring by the movement of the first body 101 is defined as a first manner or type roll-in, a roll-in occurring by the movement of the second body 102 is defined as a second manner or type roll-out, and a roll-in occurring by the movement of the first and second bodies 101 and 102 may be defined as a third manner or type roll-in.

The manners in which the roll-out or roll-in occurs may be distinguished according to whether the roll-out or roll-in is made by the movement of either the first body 101 or the second body 102.

Hereinafter, a method of selectively outputting various screen information based on the first to third manners will be described in detail. In the variations or embodiments to be described, the same or similar reference numerals are given to the same or similar components as those of the foregoing embodiment and the description is replaced with the first explanation.

FIG. 3 is a flowchart illustrating a control method according to the present invention.

First, the controller 180 detects using the sensing unit 140 that at least one region of the touch screen 151 exposed to the outside of the guide unit 140 is changed by a movement of at least one of the first body and the second body (S310).

For example, the controller 180 may detect the touch screen switched from the closed state to the open state or detect that at least one region of the touch screen 151 externally exposed in the open state is changed from a first region to a second region.

In this case, the controller 180 sets at least one region exposed to the outside of the guide unit, of the entire region of the touch screen 151, as a display region (S330). For example, when the at least one region is changed from the first region to the second region, the second region may be set as the display region. When the at least one region is continuously changed due to an external force, the display region may also continuously be set differently.

The controller 180 controls the touch screen 151 such that screen information is output in the display region and the remaining region is turned off. The display region is changed in response to the occurrence of the roll-in/roll-out, and accordingly an output region of screen information is also changed.

In addition, the controller 180 controls information displayed on the display region based on the movement of the at least one of the first and second bodies (S350).

More specifically, when the roll-in or roll-out occurs, the controller 180 sets the display region and controls the touch screen 151 to output different screen information in the display region based on a manner in which the roll-in or roll-out occurs.

For example, when the closed state is switched to the open state by the movement of the at least one of the first and second bodies, the controller 180 may control the touch screen 140 such that different display information can be output in the display region according to the at least one body which has made the movement.

When the closed state is switched to the open state by the movement of the first body 101 (or when the closed state is switched to the open state by the first type roll-out), the controller 180 may output first screen information in the display region. On the other hand, when the close state is switched to the open state by the movement of the second body (or when the close state is switched to the open state by the second type roll-out), the controller 180 may output second screen information in the display region. Alternatively, when the closed state is switched to the open state by the movement of the first and second bodies (or when the closed state is switched to the open state by the third type roll-out), the controller 180 may output third screen information in the display region.

As another example, when the second region of the touch screen 151 is exposed by the movement of the at least one of the first and second bodies while a first execution screen of an application is output in the first region of the touch screen 151 in the open state, the controller 180 may execute any one of functions associated with the application based on the movement of the at least one body. In this case, the controller 180 may display the first execution screen in the first region and a second execution screen corresponding to the one function in the second region.

When the second region is exposed by the movement of the first body 101 (or when the first type roll-out occurs), the controller 180 may execute a first function of the functions associated with the application. On the other hand, when the second region is exposed by the movement of the second body 102 (or when the second type roll-out occurs), the controller 180 may execute a second function of the functions associated with the application. Alternatively, when the second region is exposed by the movement of the first and second bodies 101 and 102 (or when the third type roll-out occurs), the controller 180 may execute a third function of the functions associated with the application.

When the display region is opened to leftward, rightward or both leftward and rightward, the controller 180 may execute different functions according to the opening method, and accordingly display different screen information in the display region. Since a different function may be executed according to whether the touch screen 151 is opened to the left or to the right and an execution screen of the function is displayed in the display region which is expanded by the roll-out, the user can immediately access a function or information desiring to use as soon as expanding the display region. This may result in providing a new user interface that has not been provided before and increasing user convenience.

As described above, when the display region is expanded by the roll-out, it may be roughly classified into two cases. One case is switching from the close state to the open state, and the other case is switching from the first region to the second region while screen information is output in the first region of the touch screen 151 in the open state. The above two cases will be described in detail with reference to the accompanying drawings.

First, the case where the closed state is switched to the open state will be described.

Figure 4A:
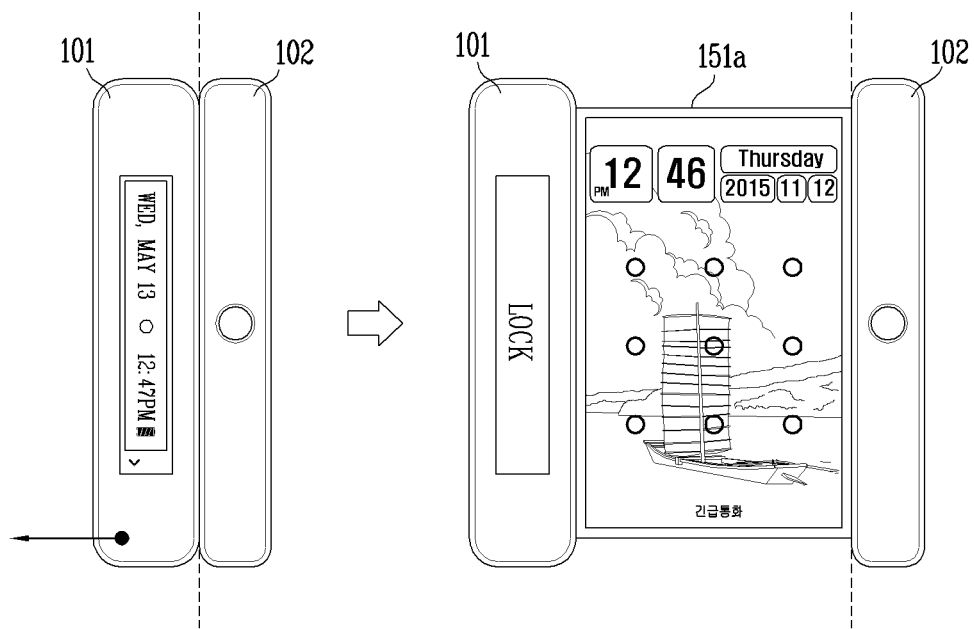
FIGS. 4A, 4B, and 4C are conceptual views illustrating an operation of the rollable mobile terminal in case of switching from a closed state to an open state.
Figure 4B:
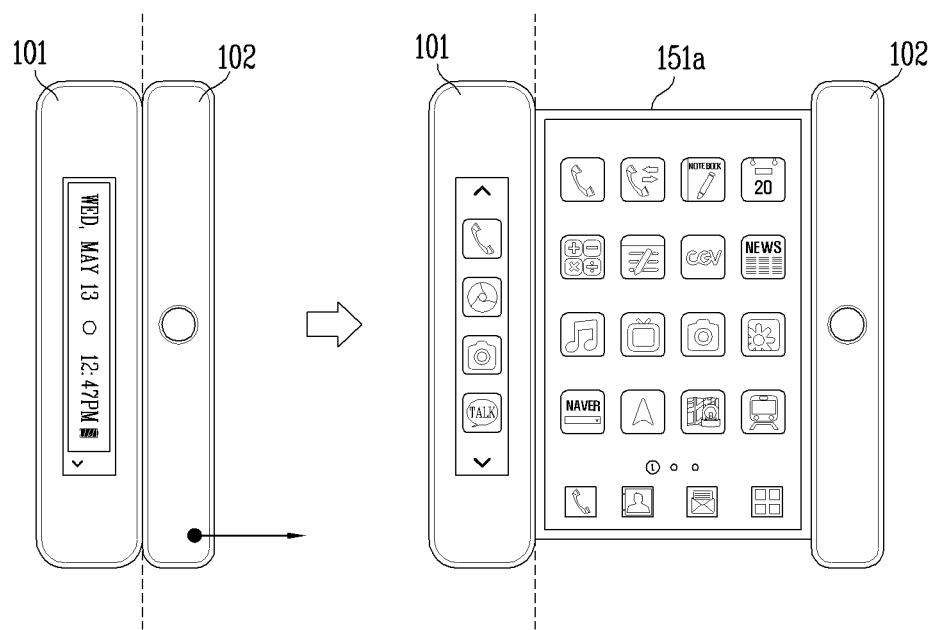
Figure 4C:
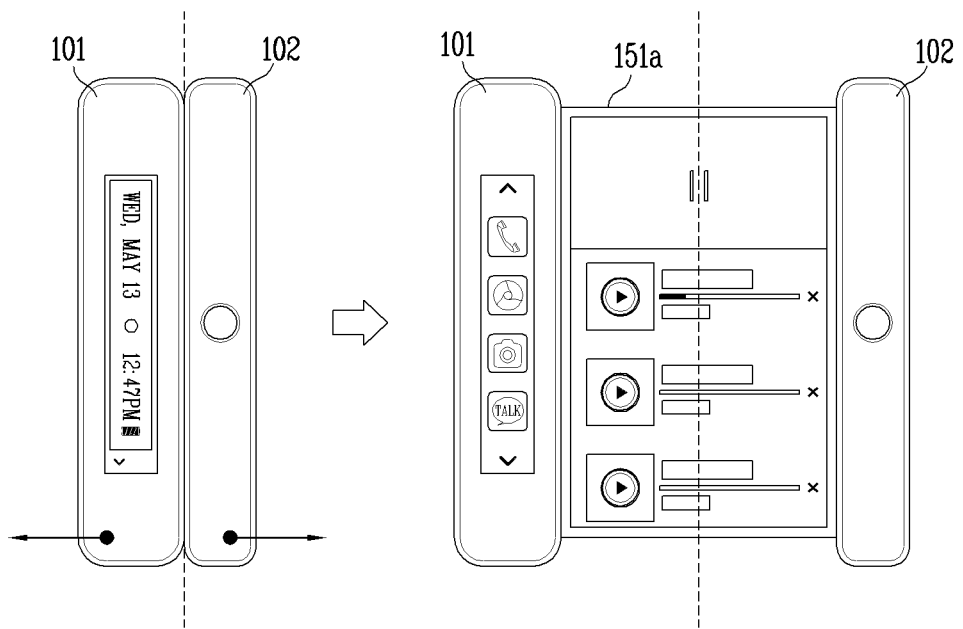

FIGS. 4A, 4B, and 4C are conceptual views illustrating an operation of the rollable mobile terminal in case of switching from a closed state to an open state.

Referring to FIG. 4A, the rollable mobile terminal includes first and second bodies 101 and 102, a first touch screen 151a accommodated in at least one of the first body 101 and the second body 102, and a controller 180 (see FIG. 1A).

When the user wishes to use the rollable mobile terminal, the user switches the closed state to the open state. When the closed state is switched to the open state, the controller 180 controls the first touch screen 151a so that the display region is turned on and the remaining region is turned off of the entire region of the first touch screen 151a which is in an off-state.

Meanwhile, the controller 180 may execute a different mode depending on how the switching to the open state is executed. Specifically, a first mode may be executed when the first type roll-out occurs, a second mode may be executed when the second type roll-out occurs, and a third mode may be executed when the third type roll-out occurs.

As illustrated in FIG. 4A, the first mode may be a private mode, which is accessible only when a password set by the user is input. Personal information, such as a hidden folder or content set in a secret, which the user does not want to expose to a third party, may be displayed on the display region only when the private mode is executed and a user-set authentication is completed.

The private mode may be executed only when the first type roll-out occurs, and a lock screen for executing the user-set authentication procedure may be displayed in the display region. For example, the lock screen may include graphic objects for inputting a pattern set by a user. Although not illustrated, a virtual keypad for inputting a password or a message for requesting finger scanning or face scanning may be displayed in the display region.

When the authentication procedure set by the user is executed in the private mode, a private home screen page corresponding to the private mode is displayed in the display region.

The controller 180 terminates the private mode when the display region is turned off or the open state is switched to the closed state.

The second mode, as illustrated in FIG. 4B, may be a general mode which can be accessed by anyone. When the general mode is executed by the second type roll-out, a general home screen page corresponding to the general mode is displayed in the display region. In the general mode, files, folders, and icons of other contents or applications, which have been set by the user in secret, are not displayed in the display region. In other words, the general home screen page includes files, folders, and/or application icons accessible even without user authentication.

Since different types of modes are executed when opening the terminal to the left and to the right, the user may more comprehensively use the rollable mobile terminal.

On the other hand, as illustrated in FIG. 4C, when the user pulls the first and second bodies 101 and 102 to both sides to expand the display region, a wider screen may be directly used. In this case, the controller 180 executes the third mode so that the user can access a content or function requiring a wide screen more quickly. The third mode may be referred to as a multimedia mode.

Opening both sides may be understood as the user's intention to use a wide screen. Accordingly, when the multimedia mode is executed, a recently used multimedia list may be output in the display region, and the user can directly select and use a specific content from the multimedia list. That is, a recently-reproduced video (moving image) or a recently-captured image can be displayed in the display region.

The controller 180 may display any one of first to third screen information on a part of the display region based on a body moved by an external force of the first and second bodies 101 and 102. At least one of the first to third screen information, which is preset to be output to the display region according to the body moved by the external force, may be reset to another screen information according to a user input. For example, when the first screen information is set to the private home screen page and the second screen information is set to the general home screen page, the first screen information may be reset to the general home screen page and the second screen information may be reset to the private home screen page. This may allow the user to reset an optimal interface according to his/her taste.

In the meantime, the rollable mobile terminal may further include a memory 179 (see FIG. 1A) for storing first and second user accounts having different access rights with respect to files stored in the terminal and functions executable in the terminal.

The controller 180 may log into the first user account when the closed state is switched to the open state by the movement of the first body, and log into the second user account when the closed state is switched to the open state by the movement of the second body.

A different home screen page may be output in the display region depending on an account which is logged in. For example, when the first user account is logged in, a home screen page corresponding to the first user account may be displayed in the display region. In another example, when the second user account is logged in, a home screen page corresponding to the second user account may be displayed in the display region.

The first and second user accounts may be matched to different phone numbers. For example, the first user account may correspond to a first phone number, and the second user account may correspond to a second phone number. When the first user account is logged in, a call origination/termination by the first phone number is performed and applications installed in the terminal operate based on the first phone number. Accordingly, the user can perform a business operation using the first user account, and a personal operation using the second user account.

On the other hand, the type of roll-out and the user account corresponding to the roll-out may be set, edited or deleted by a user input.

The user may log into different user accounts depending on how the rollable mobile terminal is opened for use. For example, the user can use the terminal through the first user account by switching the closed state to the open state using the first type roll-out. Thereafter, the user can use the terminal through the second user account by switching the open state to the closed state using the roll-in and switching the closed state to the open state using the second type roll-out. This may allow the user to use one terminal as if using a plurality of terminals.

Meanwhile, the display region may be expanded while screen information is displayed on the display region. More specifically, while the screen information is displayed on the first region of the first touch screen 151a, the second region of the first touch screen 151a may be exposed to the outside by the roll-out. In this case, the display region extends from the first region up to the second region. That is, the display region includes the first and second regions.

In this case, the controller 180 may perform different controls according to screen information displayed in the first region and the manner in which the roll-out occurs. Hereinafter, a case where the display region is changed by roll-out in the open state will be described in detail.

Figure 5A:
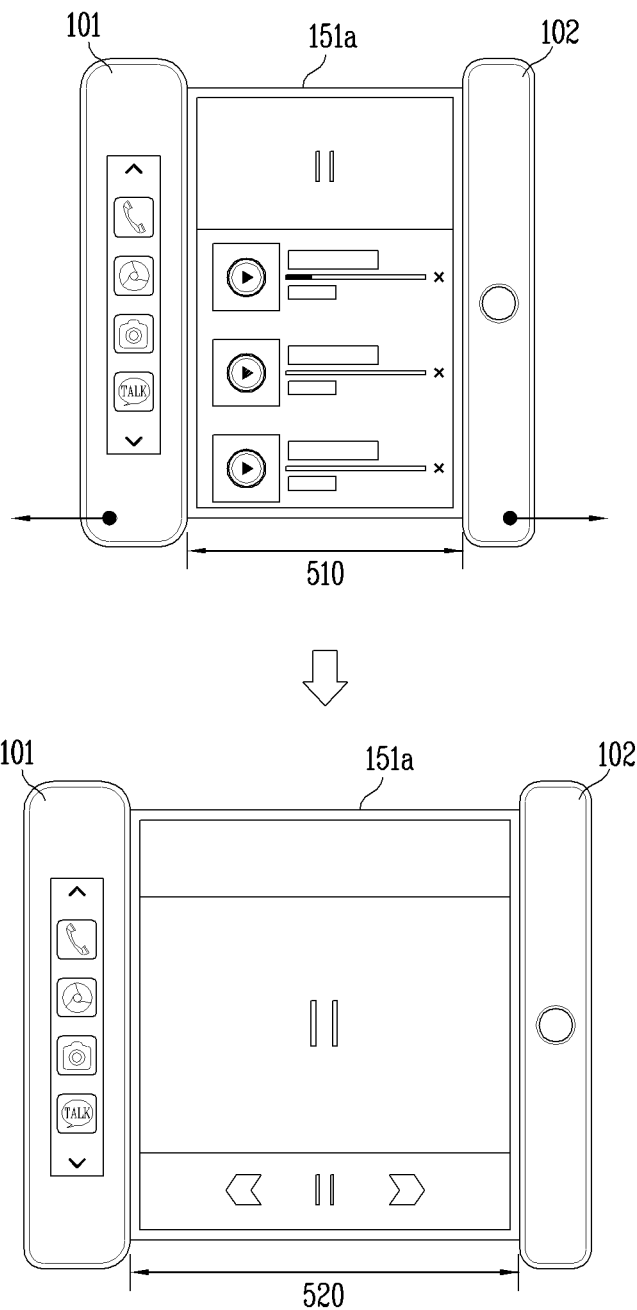
FIGS. 5A to 11B are conceptual views illustrating a rollable mobile terminal that performs different functions according to currently-output screen information when a display region is changed by roll-out in an open state.
Figure 11A:
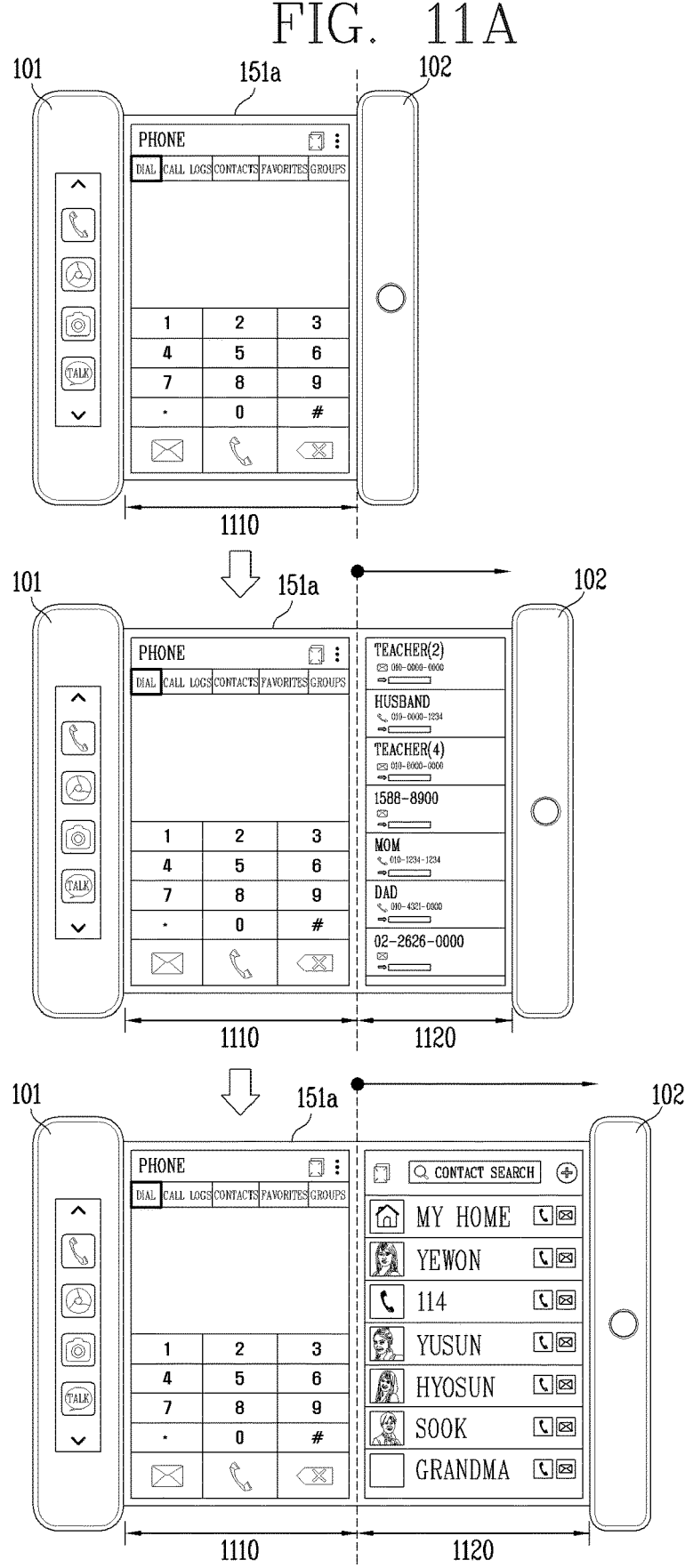
Figure 11B:
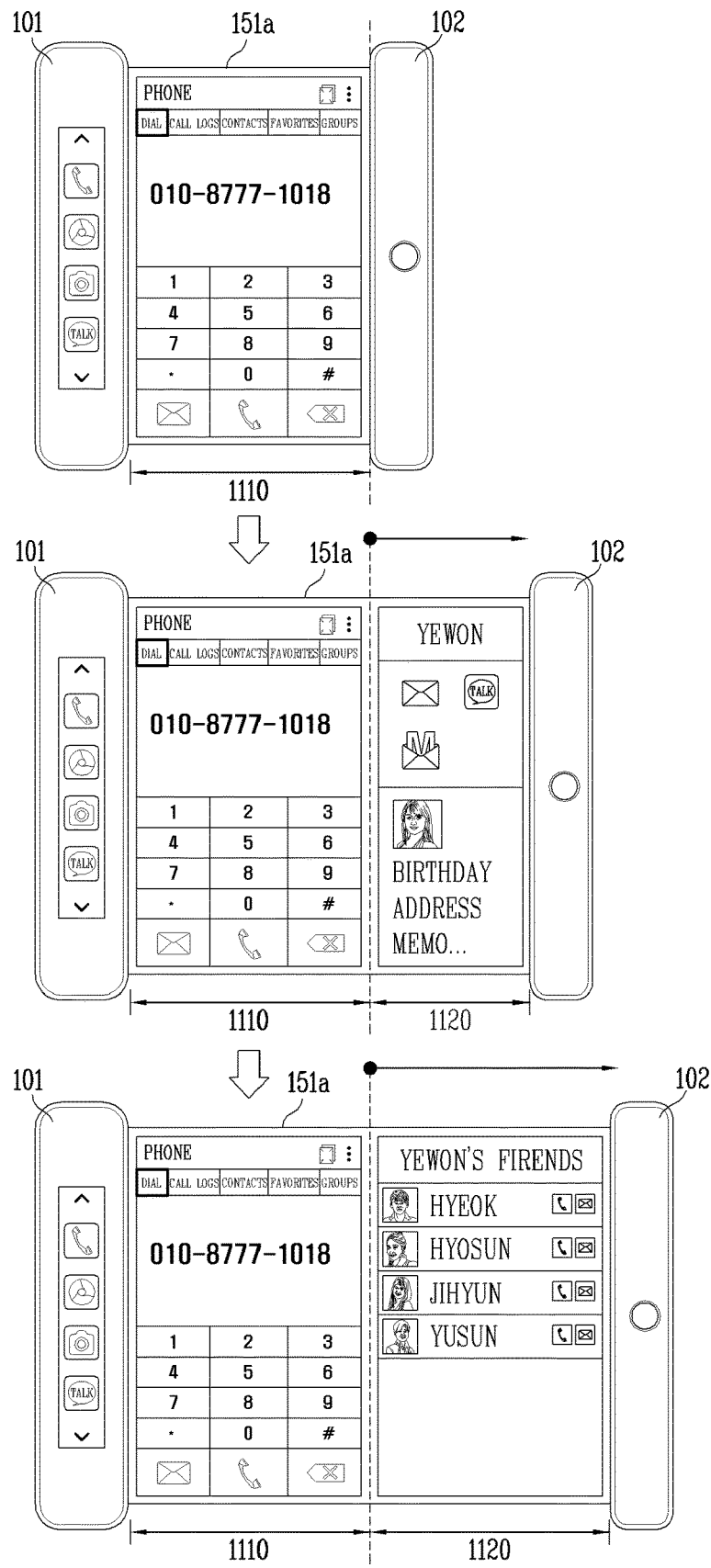

FIGS. 5A and 11B are conceptual views illustrating the rollable mobile terminal that performs different functions according to currently-output screen information when the display region is changed by a roll-out operation in the open state.

FIG. 5A illustrates the rollable mobile terminal operating in a multimedia mode. When the multimedia mode is executed, a recently-output multimedia list is displayed in the display region. The multimedia list includes one or more multimedia data. The multimedia data indicates digital contents which are formed in various formats such as voice, text, pictures, videos and the like and are output on the first touch screen 151a. The multimedia data may be stored in the memory 170 or in an external server and received through the wireless communication unit 110.

Meanwhile, the display region may be changed from a first region 510 to a second region 520 by the movement of the first and second bodies 101 and 102 while screen information is displayed in the display region. In other words, the first region 510 may be reduced or enlarged to the second region 520 by the third type roll-in or the third type roll-out.

In this case, the controller 180 displays screen information, which has been displayed in the first region 510, in the second region 520 and increases or decreases a size of content included in the screen information based on a size of the second region 520. As the display region is reduced/enlarged at a predetermined ratio, an output region of the screen information is also reduced/enlarged and accordingly the content included in the screen information is also reduced/enlarged.

Meanwhile, the controller 180 may control information displayed in the display region differently according to the size of the display region. More specifically, if the display region is smaller than a reference size, the display region which is outputting the multimedia list is expanded gradually by the third type roll-out. Then, when the display region becomes larger than the reference size, one multimedia included in the multimedia list may be selected and displayed in the display region. That is, the selected one multimedia data is displayed in the display region instead of the multimedia list.

The selected one multimedia data may be a multimedia which has been most recently output or a multimedia whose playback is paused without being fully played back. Alternatively, the selected one multimedia data may be any one of the multimedia items included in the multimedia list, to which a touch has been applied.

When the selected one multimedia is displayed in the display region, graphic objects associated with a control function related to the selected one multimedia may be further displayed in the display region. For example, when the selected one multimedia is a moving picture or video, graphic objects related to a video playback are displayed in the display region. When the selected one multimedia is an electronic document, graphic objects related to outputting/editing of electronic documents may be displayed in the display region. Different graphic objects are displayed in the display region according to the type of the selected one multimedia.

Meanwhile, a roll-out corresponding to one of the first to third type roll-outs may occur during the output of the selected one multimedia.

Figure 5B:
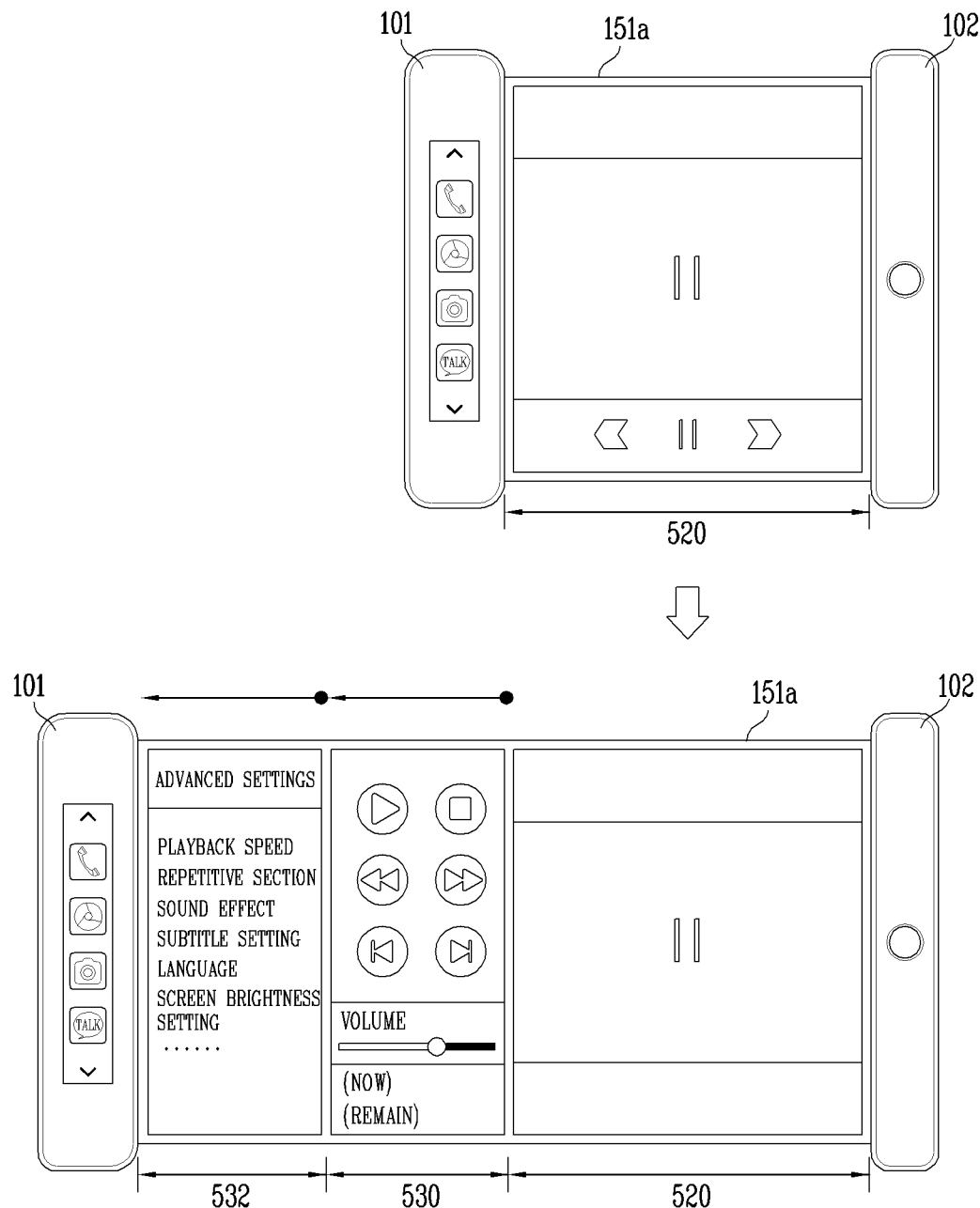

For example, as illustrated in FIG. 5B, when the first type roll-out occurs while one multimedia is displayed in the display region, at least one region of the first touch screen 151a which has been accommodated is exposed to the outside. In other words, as the first type roll-out occurs while the one multimedia is displayed in the first region 520, a left second region 530 and a left third region 532 may sequentially appear.

Figure 5C:
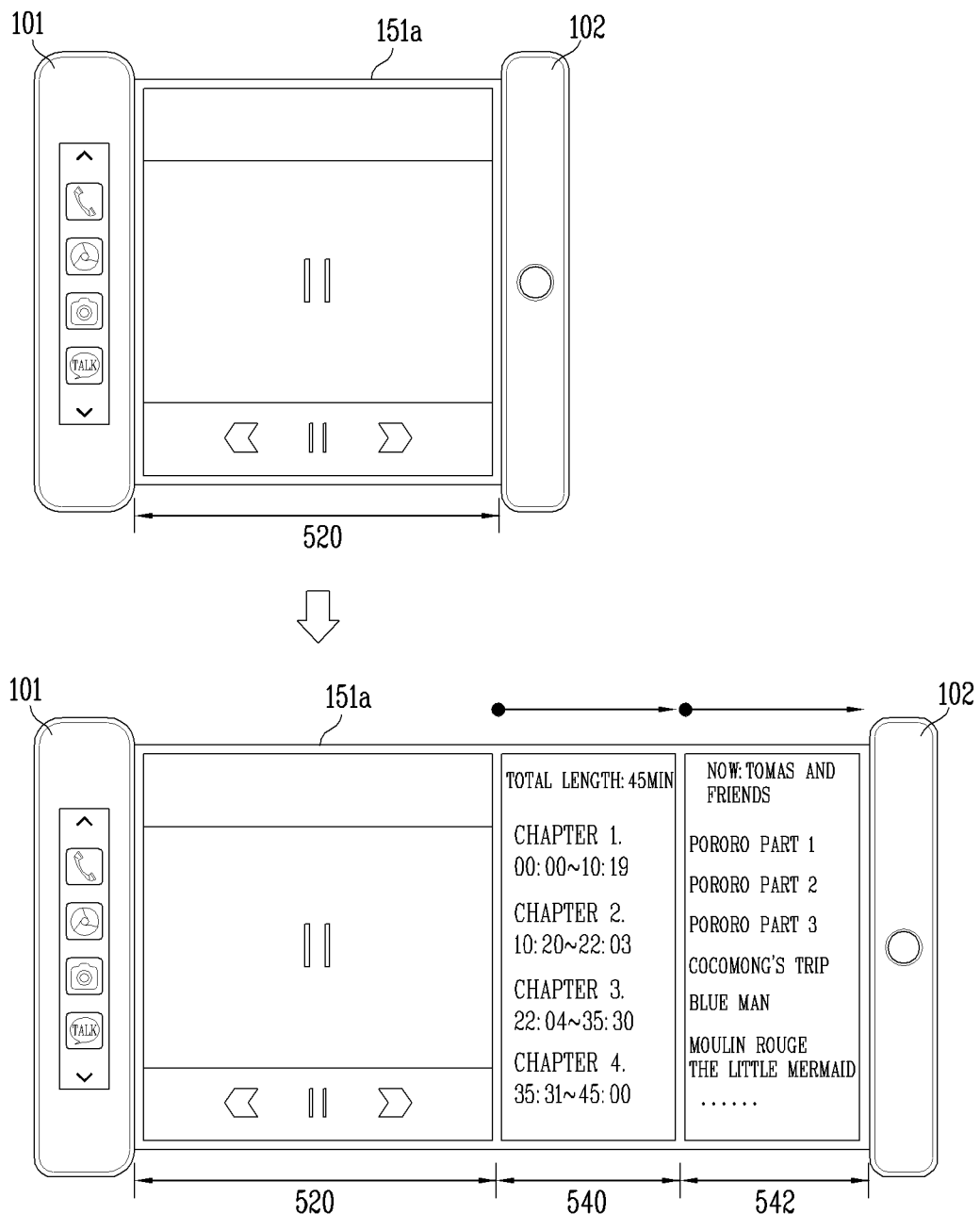

In another example, as illustrated in FIG. 5C, when the second type roll-out occurs while the one multimedia is displayed in the first region 520, a right second region 540 and a right third region 542 may sequentially appear in response to proceeding the roll-out.

In this case, the controller 180 may execute a different function based on the movement of one of the first and second bodies 101 and 102 which has caused the roll-out. More specifically, when the second region 530 or 540 of the first touch screen 151a is exposed by the movement of the one of the bodies while a first execution screen of an application is output in the first region 520, the controller 180 executes any one of functions related to the application based on the movement of the one of the bodies. Further, the controller 180 displays the first execution screen in the first region 520 and a second execution screen corresponding to the one function in the second region 530 or 540.

For example, as illustrated in FIG. 5B, when the left second region 530 is exposed by the first type roll-out, graphic objects included in a first group may be displayed in the left second region 530. The graphic objects included in the first group may be associated with a playback of the multimedia being output in the first region 520. The graphic objects may be associated with functions frequently used by the user.

Continuously, when the left third region 532 is exposed by the first type roll-out, graphic objects included in a second group may be displayed in the left third region 532. The graphic objects included in the second group may be associated with functions that are not frequently used by the user in comparison with the first group.

The graphic objects included in the first and second groups may be preset by a terminal manufacturer at the time of shipment or preset by an application manufacturer at the time of application distribution. A new graphic object may be added to one of the first and second groups or a graphic object included in one of the first and second groups may be edited or deleted, by use of a user input. Further, the controller 180 may calculate a usage amount of each of the graphic objects. The controller 180 may include graphic objects, whose usage amount meets a preset condition, in the first group, and graphic objects, whose usage amount does not meet the preset condition, in the second group. That is, the graphic objects included in the first and second groups may be varied according to the usage amount.

In another example, as illustrated in FIG. 5C, when the right second region 540 is exposed by the second type roll-out, metadata included in the multimedia may be displayed in the right second region 540.

Subsequently, when the right third region 542 is exposed by the second type roll-out, a multimedia list may be output in the right third region 542. The multimedia list output in the right third region 542 is related to a multimedia being output in the first region 520. The multimedia list may include multimedia stored in the same folder or multimedia having the same name as that included in their titles.

Meanwhile, a roll-out may occur while a home screen page is output in the first region of the first touch screen 151a. Different information may be displayed in the second region of the first touch screen 151a exposed by the roll-out according to the type of roll-out.

For example, as illustrated in FIG. 6A, when a left second region 620 is exposed by the first type roll-out while a home screen page is displayed in a first region 610, the controller 180 may output a new home screen page in the left second region 620. In other words, the same home screen page is displayed in the first region 610 and the left second region 620.

The first region 610 and the left second region 620 may be used as windows that operate independently. Specifically, when a touch input is applied to the first region 610, screen information being output in the first region 610 is switched to another screen information, but screen information being output in the second region 620 is continuously output.

Figure 6B:
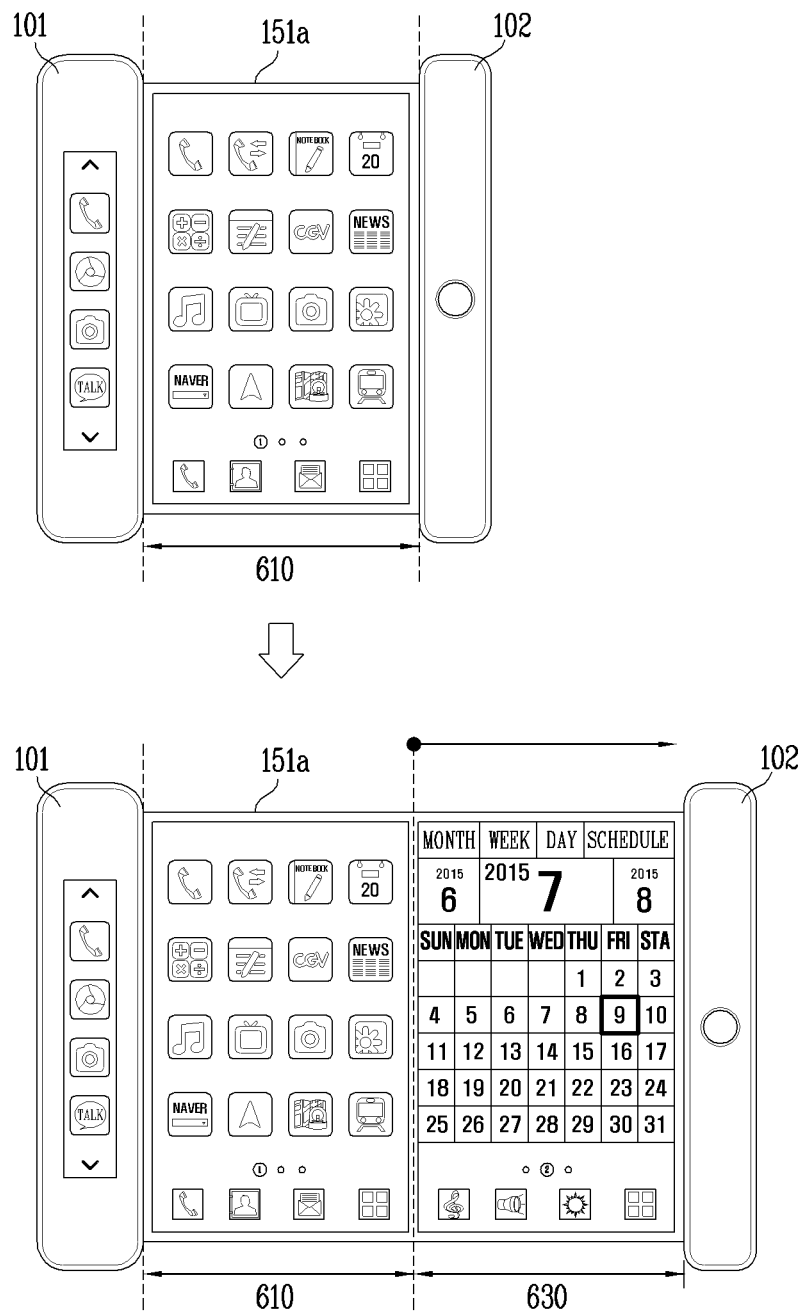

Meanwhile, a home screen page may include a plurality of pages. As illustrated in FIG. 6B, a first page of the plurality of pages may be displayed in the first region 610. When a right second region 630 is exposed by the second type roll-out while the first page is displayed in the first region 610, a second page of the plurality of pages may be displayed in the right second region 630. In other words, the first page is displayed in the first region 610 and the second page is displayed in the right second region 630.

Figure 6C:
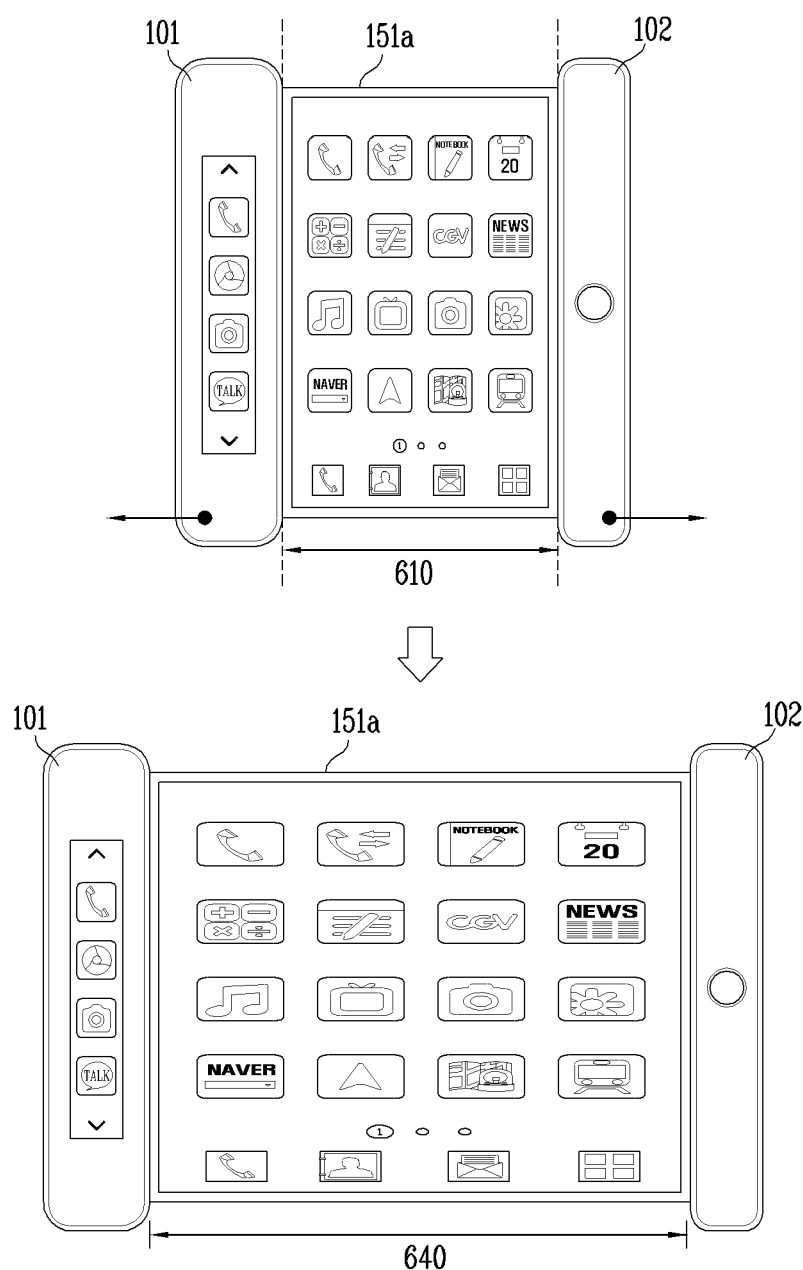

Alternatively, as illustrated in FIG. 6C, when the display region is expanded (610→640), a previously-output home screen page is displayed in an enlarged manner.

Figure 7A:
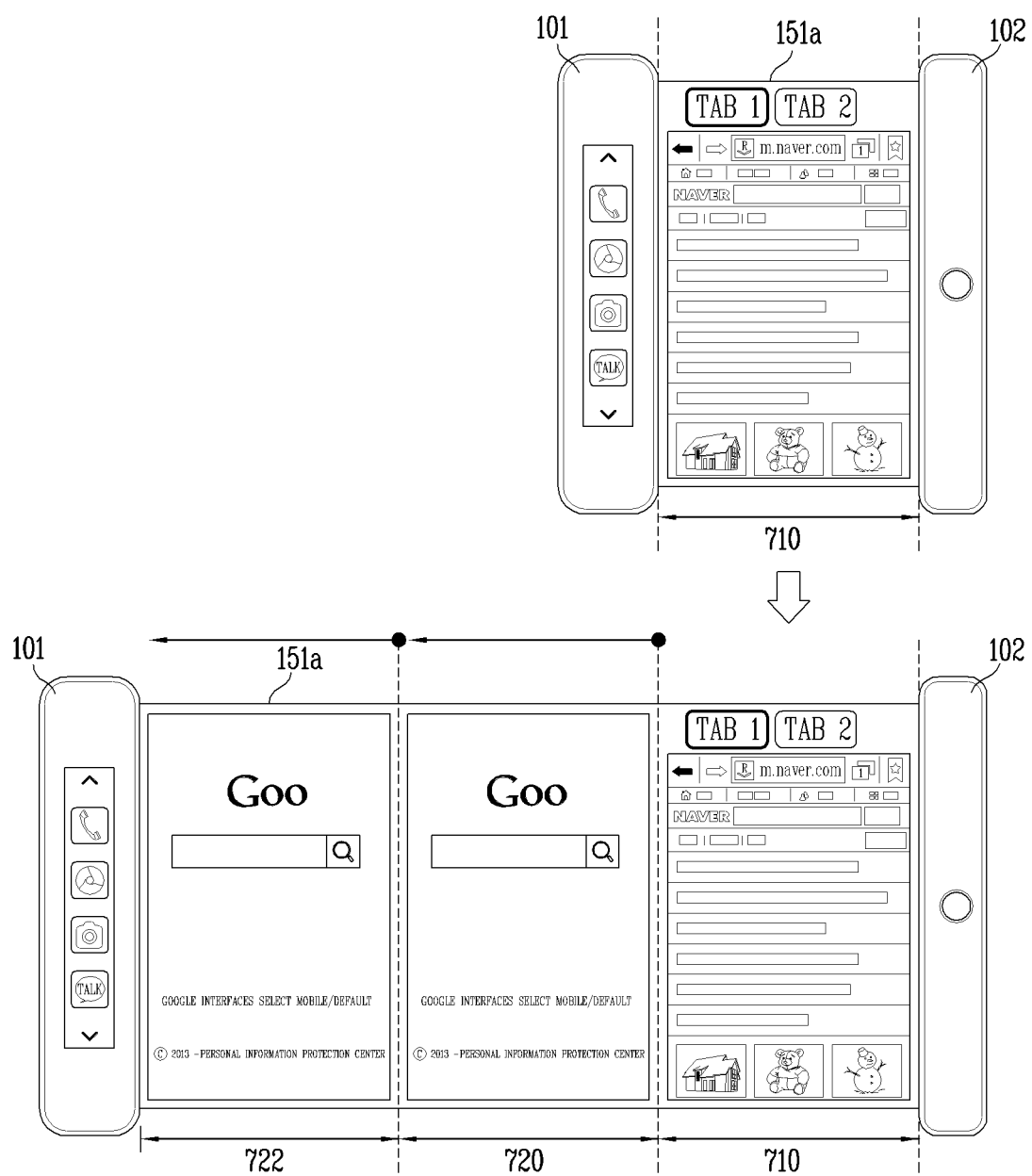
Figure 7C:
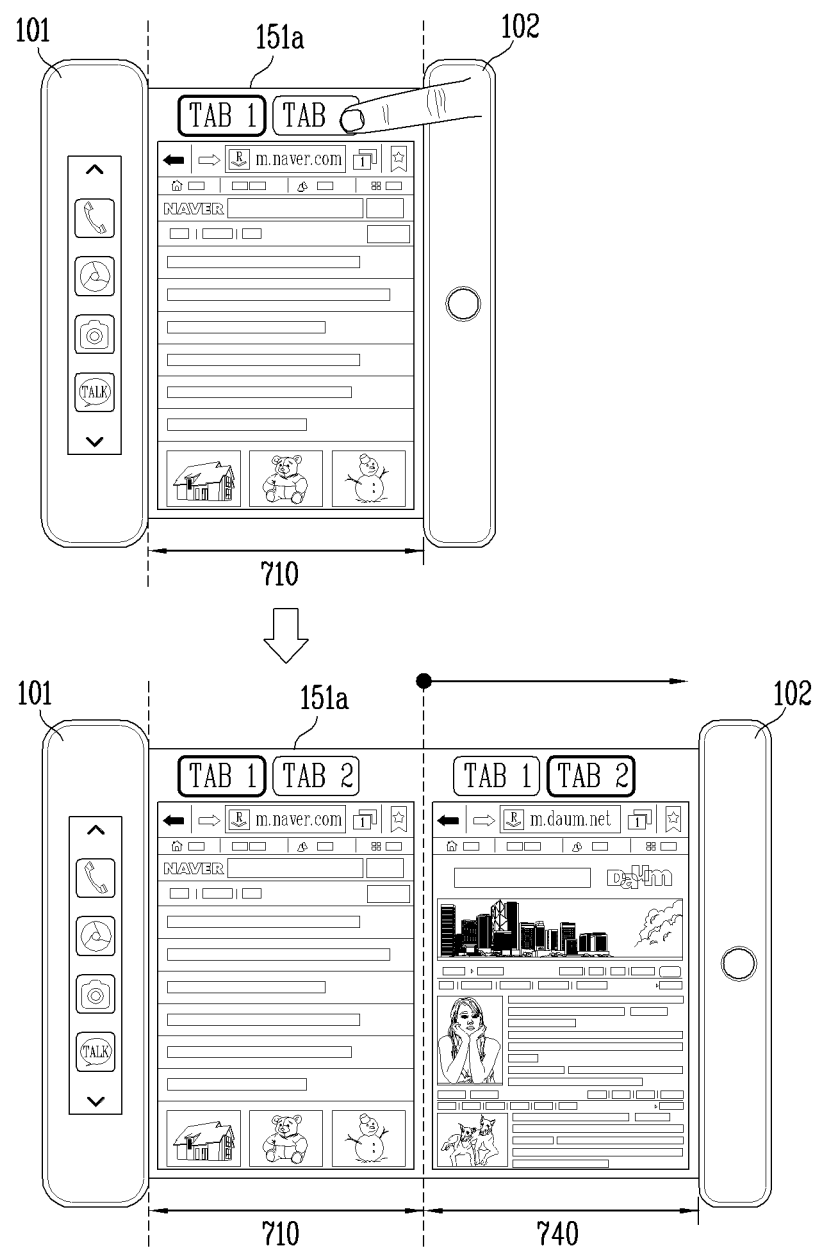

FIGS. 7A to 7C are views illustrating an operation when a roll-out occurs while an execution screen of a browser application is output in the display region.

A new window opening function may be executed by the first type roll-out, a non-output information display function may be executed by the second type roll-out, and a screen enlarging function may be executed by the third type roll-out.

The new window opening function refers to a function of outputting a second execution screen of an application in the second region of the second touch screen 151b when the second region is exposed while a first execution screen of the application is displayed in the first region of the first touch screen 151a. The second execution screen output in the second region by the new window opening function may be an initial screen that is set to be output first when the application is executed.

For example, as illustrated in FIG. 7A, when the first type roll-out occurs while a web page of a first URL is displayed in a first region 710, the display region 710 may extend and accordingly an initial screen of a browser application may be displayed in the extended display regions 720 and 722.

The controller 180 measures at least one of the display region and the remaining region using the sensing unit 140. The controller 180 decides the number of windows to be displayed in the display region according to the measurement result. In this case, the controller 180 divides the display region into different regions based on the size of the display region, and outputs different windows in the divided regions.

For example, when the decided number of windows to be output is two, a first window corresponding to the first execution screen is displayed in the first region 710, and a second window corresponding to the second execution screen is displayed in the second region 720. In another example, as illustrated in FIG. 7A, when the decided number of windows to be output is three, a first window corresponding to the first execution screen may be displayed in the first region 710, and second and third windows corresponding to the second execution screen may be displayed in the second and third regions 720 and 722, respectively.

The non-output information display function refers to a function of outputting information, which has not been output in the first region, in the second region when the second region of the second touch screen 151b is exposed while a first execution screen of an application is displayed in the first region of the first touch screen 151a.

More specifically, when screen information is output in the first region, the controller 180 moves the screen information to the first region such that information to be output (to-be-output information) can be sequentially output along a direction that a preset touch input is applied to the first region. In other words, if there is information to be output, the controller 180 may execute a scroll operation of moving currently-output screen information with respect to the information to be output.

When the information to be output exceeds the first region, screen information which has not been output is included in the information to be output. For example, as illustrated in FIG. 7B, when a length of the to-be-output information 740 exceeds the first region 710, a first portion of the to-be-output information 740 may be output in the first region 710 and the remaining portion except for the first portion may not be output.

When the non-output information display function is executed, the controller 180 controls the first touch screen 151a so that a portion different from the portion being output in the first region is output in a region exposed by the roll-out.

For example, when the decided number of windows to be output is two, the controller 180 may display a first window corresponding to a first portion of the to-be-output information 740 may be displayed in the first region 710, and a second window corresponding to a second portion of the to-be-output information 740 in the second region 730. In another example, as illustrated in FIG. 7B, when the decided number of windows to be output is three, a first window corresponding to the first portion may be displayed in the first region 710, and second and third windows corresponding to different portions of the to-be-output information 740 may be displayed in second and third regions 730 and 732, respectively.

The user can immediately access various functions by opening at least one of the first and second bodies 101 and 102 according to a function to be executed. The present invention provides a new user interface, which has not been proposed in the related art, in that the display region is not simply expanded but an execution screen of a different function is output as soon as the display region is expanded.

On the other hand, the screen enlarging function refers to a function of displaying screen information, which is output in the first region, in the second region and enlarging a size of content included in the screen information based on a size of the second region.

Graphic objects corresponding to a plurality of tabs may be included in an execution screen of a browser application. For example, as illustrated in FIG. 7C, a first graphic object 760 corresponding to a first tab and a second graphic object 762 corresponding to a second tab may be output in the first region 710.

When a touch is applied to the second graphic object 762 while the first tab is displayed in the first region 710, the first tab is switched to the second tab. Alternatively, when the roll-out occurs while a touch is applied to the second graphic object 762, the first tab is displayed in the first region 710 and the second tab is displayed in the region 730 exposed by the roll-out.

Figure 8A:
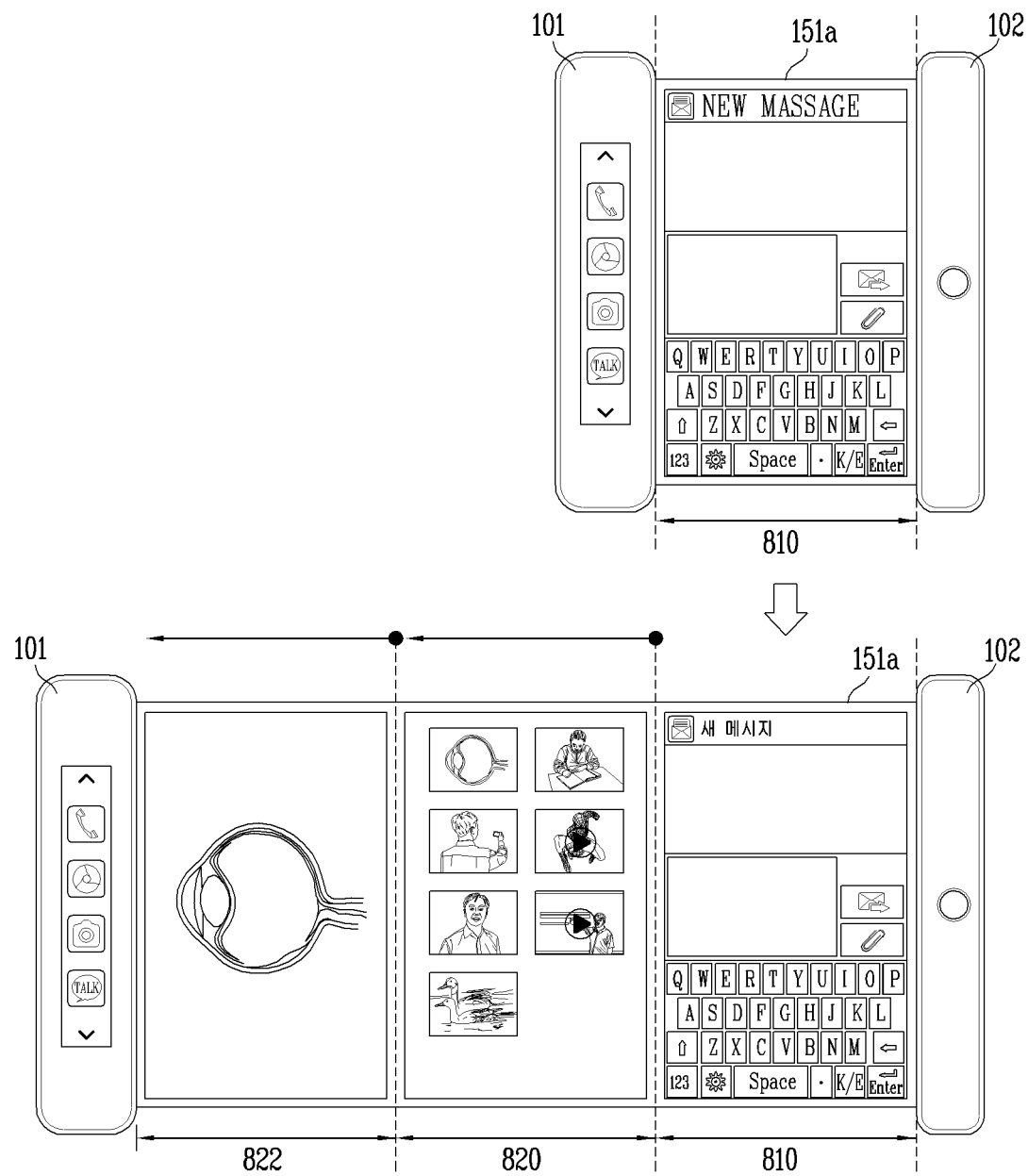
Figure 8B:
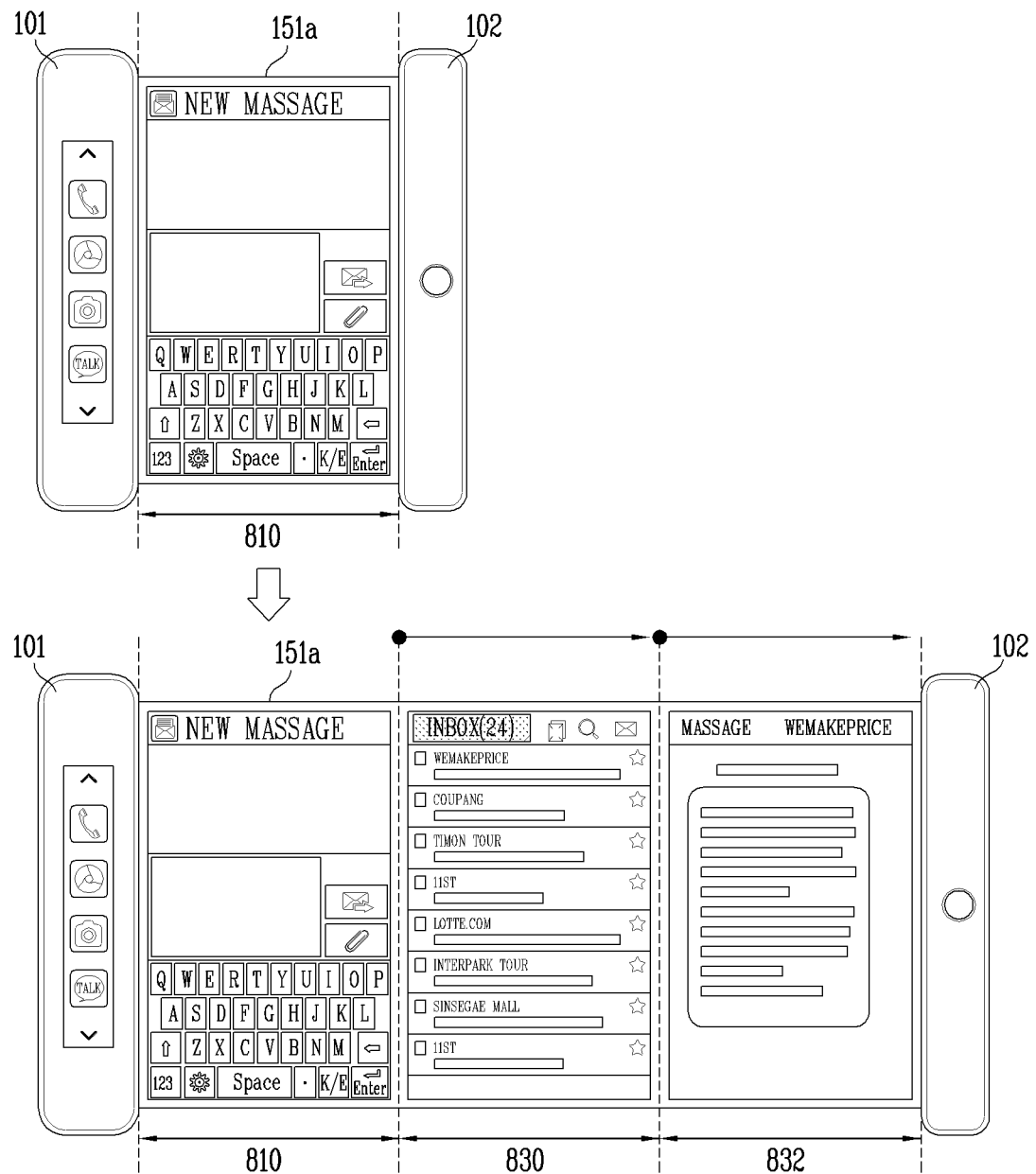
Figure 8C:
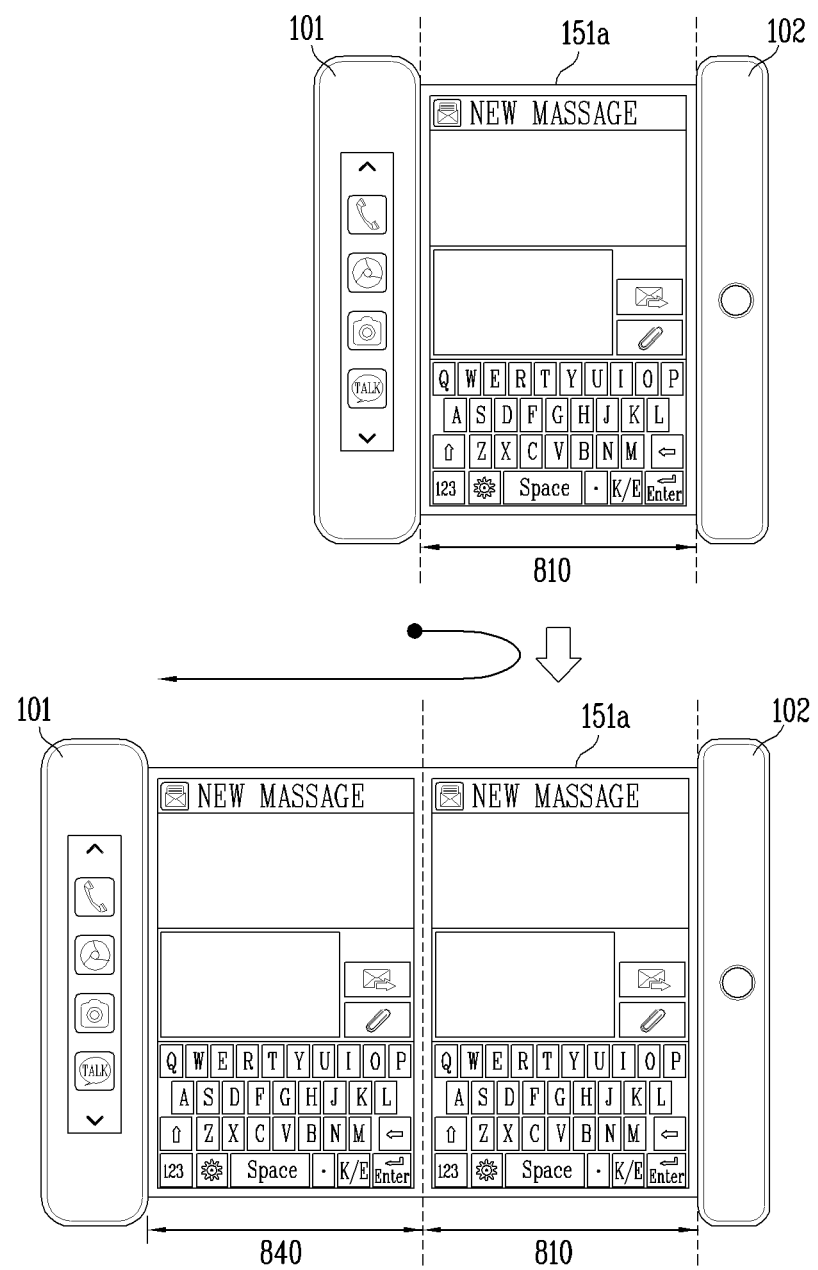

FIGS. 8A to 8C are views illustrating operations when a roll-out occurs while an execution screen of a mail or message application is output in the display region.

When a mail or message application is executed, a message writing screen for writing (composing) a new message may be output in a first region 810 of the first touch screen 151a. When the display region extends to a second region of the first touch screen 151a while the message writing screen is output, the message writing screen may be displayed in the first region 810 and different screen information may be displayed in the second region according to a manner in which the roll-out occurs.

For example, as illustrated in FIG. 8A, a left second region 820 and a left third region 822 may be gradually exposed by the first type roll-out. When the left second region 820 is exposed, the message writing screen may be displayed in the first region 810 and files to be attached to the message writing screen may be displayed in the left second region 820.

When the left third region 822 is exposed while the files are displayed in the left second region 820, detailed information related to any one of the files may be displayed in the left third region 822. When the one file is an image, the corresponding image may be displayed in the left third region 822. When the one file is a moving image or video, a reproduction screen of the corresponding moving image may be displayed in the left third region 822. On the other hand, when the one file is a document, at least one page constructing the document may be displayed in the left third region 822. The user can check files to be attached while writing a new message.

On the other hand, as illustrated in FIG. 8B, a right second region 830 and a right third region 832 may be gradually exposed by the second type roll-out. When the right second region 830 is exposed, the message writing screen may be displayed in the first region 810 and a message reception list may be displayed in the right second region 830.

When the right third region 832 is exposed while the message reception list is displayed in the right second region

830, detailed information related to one of messages included in the message reception list may be displayed in the right third region 832. The user can write a new message while checking received messages.

Additional information which is convenient when it runs together while writing a new message may be displayed step by step in the extended display region. This may allow the user to perform an additional task while writing a message.

Meanwhile, when the second region of the first touch screen 151*a* is exposed by the movement of at least one of the first and second bodies 101 and 102 while screen information is output in the first region of the first touch screen 151*a* and the movement of the at least one body meets a preset condition, the controller 180 may control at least part of the screen information being output in the first region to be displayed in the second region. This function is referred to as "copying to new window function".

There is a user need to copy currently-output screen information as it is and output it to a new window. Since the user can extend the display region using the roll-out, screen information which is being output, can be displayed as it is in the extended display region.

'Open new window function' is a function of displaying an initial screen of an application, and 'Copy to new window function' is a function of displaying a currently-output screen in a new window as it is. Therefore, these two functions are different from each other.

For example, as illustrated in FIG. 8C, when the 'Copy to new window function' is executed, information currently displayed in the first region 810 is displayed in the second region 840 as well. Since the screen is not completely opened when the second region 840 is smaller than the first region 810, a part of information being displayed in the first region 810 is displayed in the second region 840. On the other hand, since the screen is completely opened when the second region 840 is equal to or greater than the first region 810, the information being displayed in the first region 810 is displayed as it is in the second region 810.

Here, the movement satisfying the preset condition indicates that any one of the first and second bodies 101 and 102 is rolled in by a first distance and continuously rolled out by a second distance. In this case, the first distance is shorter than the second distance, and the movement satisfying the preset condition may be understood as an operation of slightly inserting and subtracting the first touch screen 151*a*.

FIGS. 9A, 9B, 10A and 10B are views illustrating operations when a roll-out occurs while an execution screen of a gallery application is being output.

When a gallery application is executed, at least one of images stored in the memory 170 or a clouding server (not illustrated) may be output in a first region 910 of the first touch screen 151*a*. When the display region extends to a second region of the first touch screen 151*a* while the at least one image is being output, the at least one image may be displayed in the first region 910 and different types of screen information may be displayed in the second region according to a type of roll-out occurred.

Figure 9A:
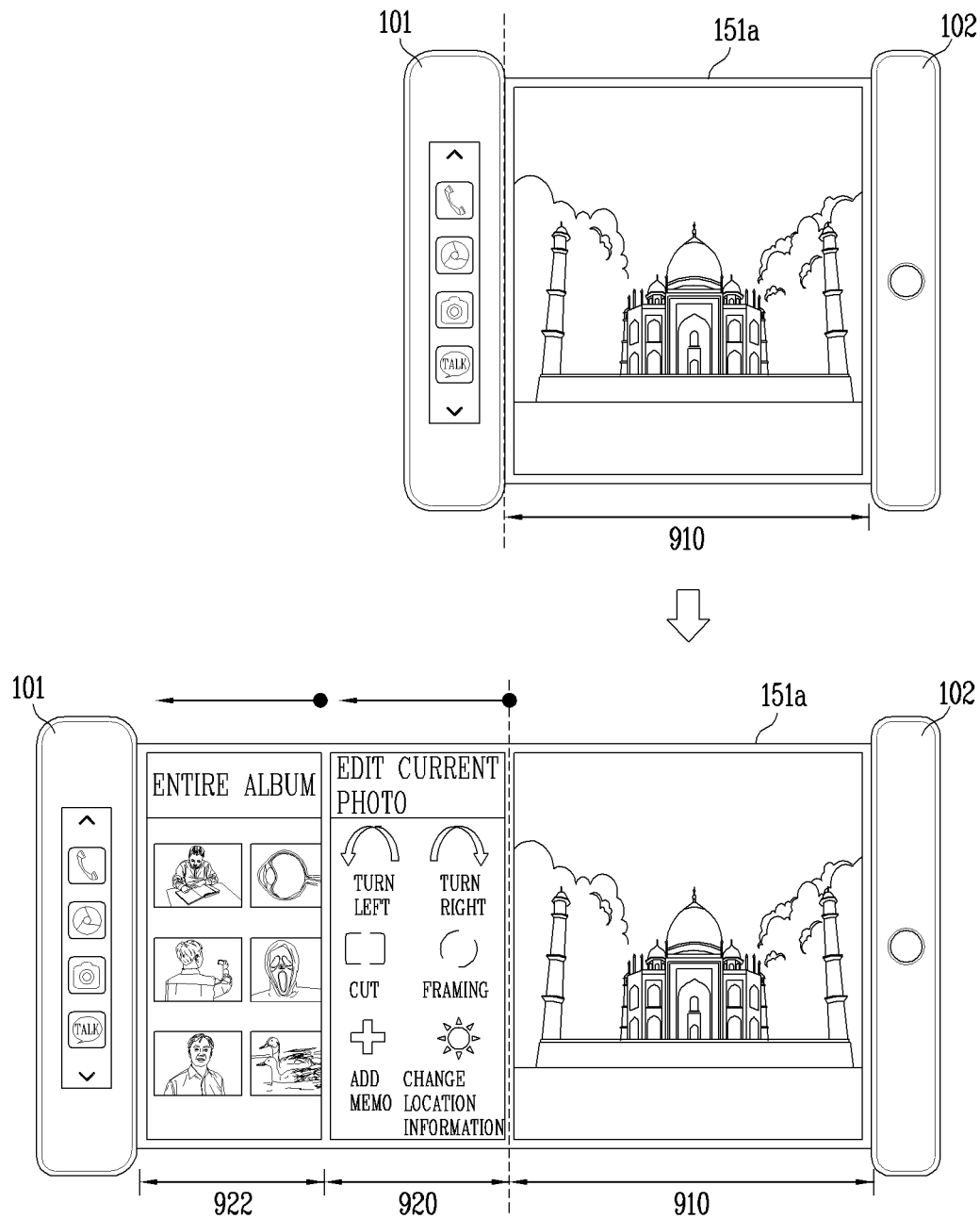

For example, as illustrated in FIG. 9A, when the first type roll-out occurs, for example, a left second region 920 and a left third region 922 may be gradually exposed by the first type roll-out. When the left second region 920 is exposed, the at least one image may be displayed in the first region 910, and graphic objects associated with editing of the image displayed in the first region 910 may be displayed in the left second region 920.

When a touch is applied to one of the graphic objects displayed in the left second region 920, a function of the one graphic object to which the touch has been applied is applied to the image displayed in the first region 910. For example, when a touch is applied to a graphic object associated with 'Turn left function', the image displayed in the first region 910 is rotated to the left by 90 degrees.

When the left third region 922 is exposed while the graphic objects associated with editing are displayed in the left second region 920, an image list to be synthesized with the first region 910 may be displayed in the left third region 922. When one of the images included in the image list is selected, the selected one image is displayed on the first region 910 and is a target to be synthesized with at least one image being displayed in the first region 910.

Figure 9B:
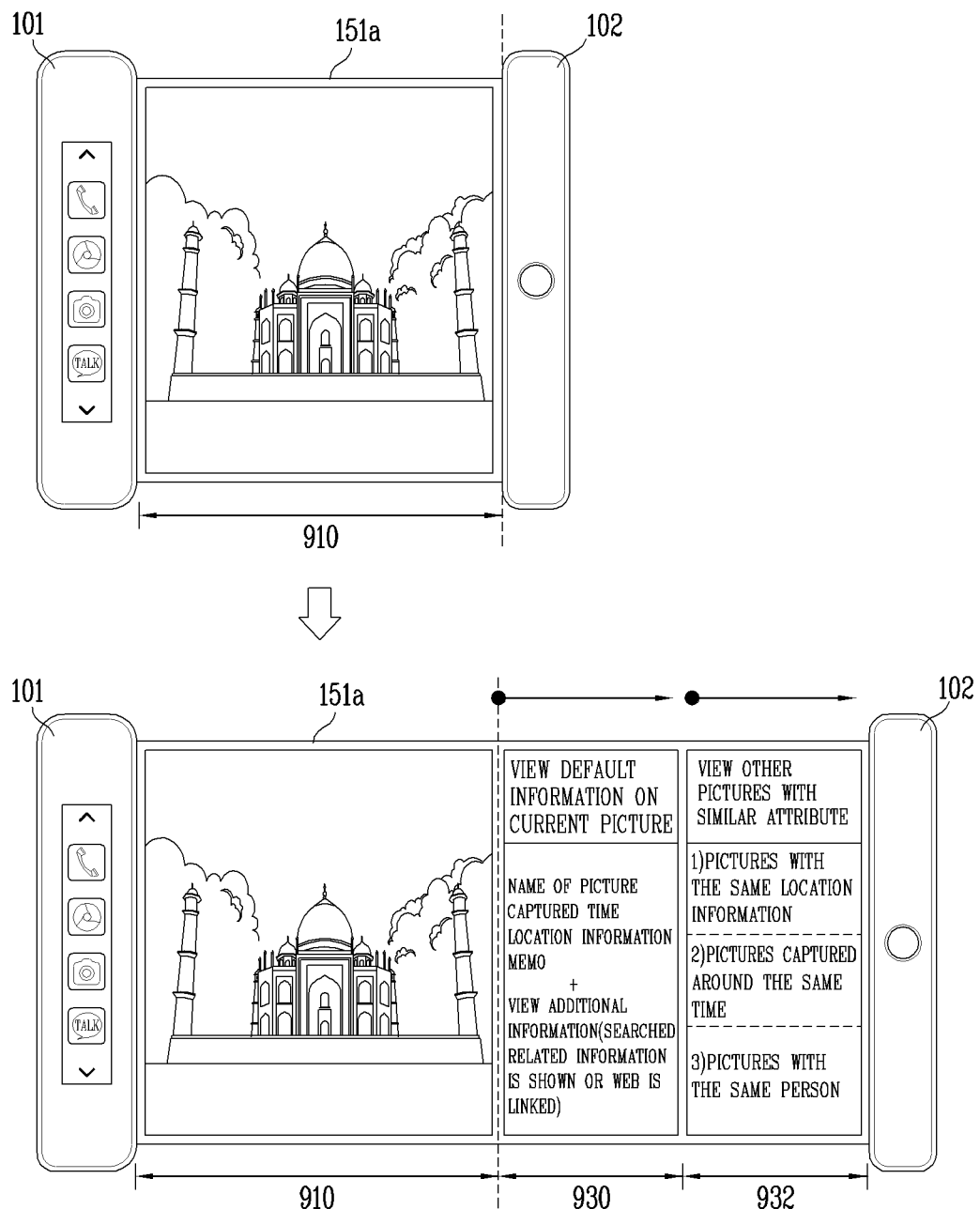

On the other hand, as illustrated in FIG. 9B, a right second region 930 and a right third region 932 may be gradually exposed by the second type roll-out. When the right second region 930 is exposed, the at least one image may be displayed in the first region 910 and information related to the at least one image may be displayed in the right second region 930.

Here, the information related to the at least one image may include at least one of a name of the image, a time at which the image is captured, a place where the image is captured, a memo inserted in the image, and metadata of the image.

When the right third region 932 is exposed while the information related to the image is displayed in the right second region 930, at least one different image having a similar attribute may be displayed in the right third region 932.

The image having the similar attribute may include at least one of an image taken at a place within a predetermined range, which may seem to be the same place, an image including the same person, and an image taken at a time within a predetermined range, which may seem to be the same time.

On the other hand, functions associated with an application may form a tree structure. The tree structure is one of data structures and refers to a structure in which connections between functions are made like branches.

The second region of the first touch screen 151*a* may be exposed by the roll-out in a state where an execution screen of an application is displayed in the first region of the first touch screen 151*a*. A first function associated with the application may be executed when the first type roll-out has occurred, and a second function associated with the application may be executed when the second type roll-out has occurred. In this case, the first function corresponds to a parent node based on an execution screen of the application, and the second function corresponds to a child node based on the execution screen of the application.

Figure 10A:
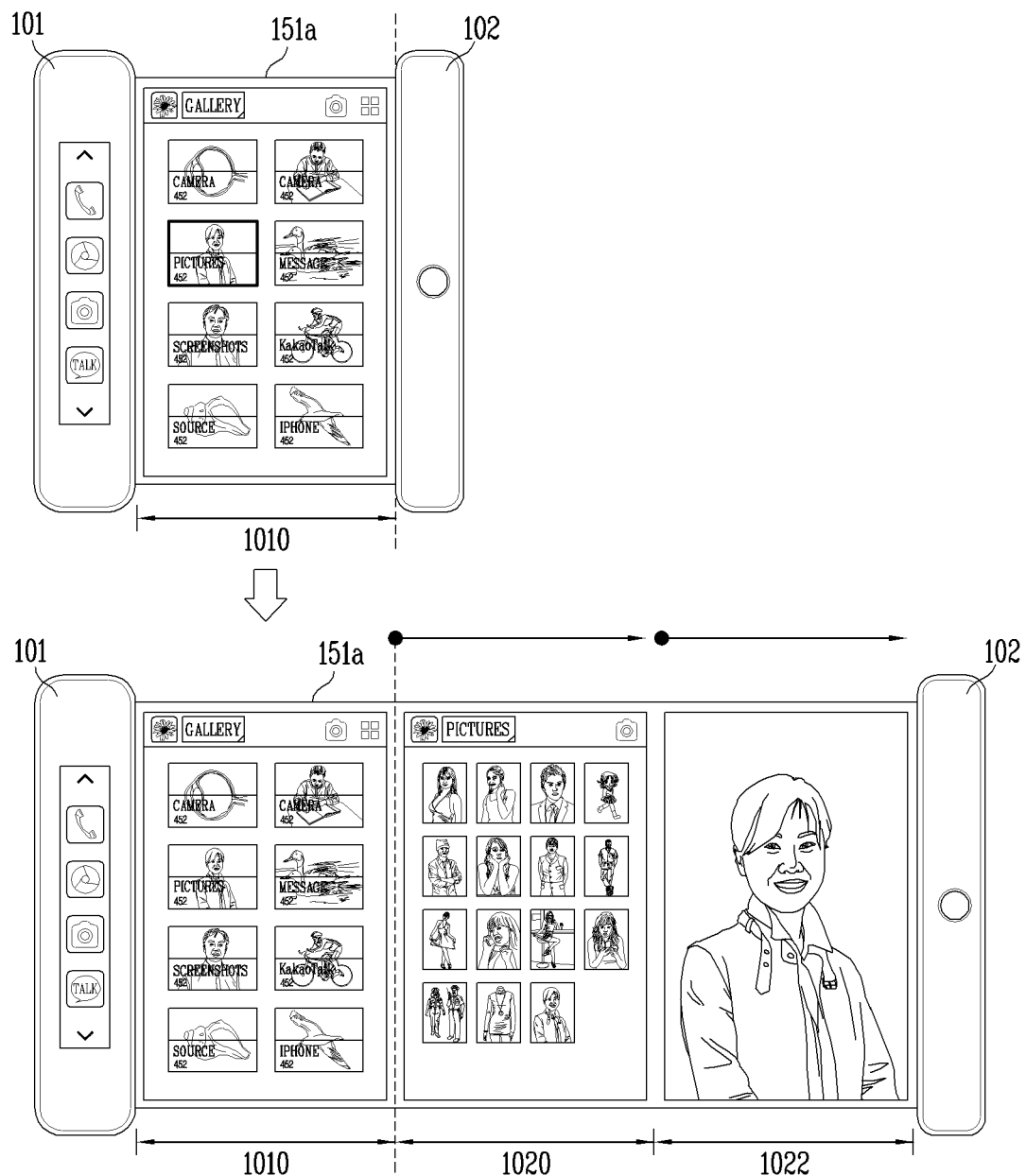

For example, as illustrated in FIG. 10A, an album list may be displayed in a first region 1010 of the first touch screen 151*a* as an execution screen of a gallery application. The album list classifies images and moving pictures into a plurality of albums and refers to a set of the albums.

When first and second albums are included in the album list, a function of displaying the album list corresponds to a higher function with respect to the first album, and a function of displaying one of the images included in the first album corresponds to a lower function with respect to the first album.

As illustrated in FIG. 10A, when the second type roll-out occurs while the album list is being displayed in the first region 1010, images included in one (character) of the albums included in the album list may be displayed in a right second region 1020 of the first touch screen 151*a* which is exposed by the roll-out. Further, when the second type roll-out occurs while the images included in the character album are being displayed in the right second region 1020, one of the images is displayed in a right third region 1022 of the first touch screen 151*a*, which is exposed by the roll-out. In other words, as the second type roll-out occurs, a lower function is executed based on screen information which is being displayed.

Figure 10B:
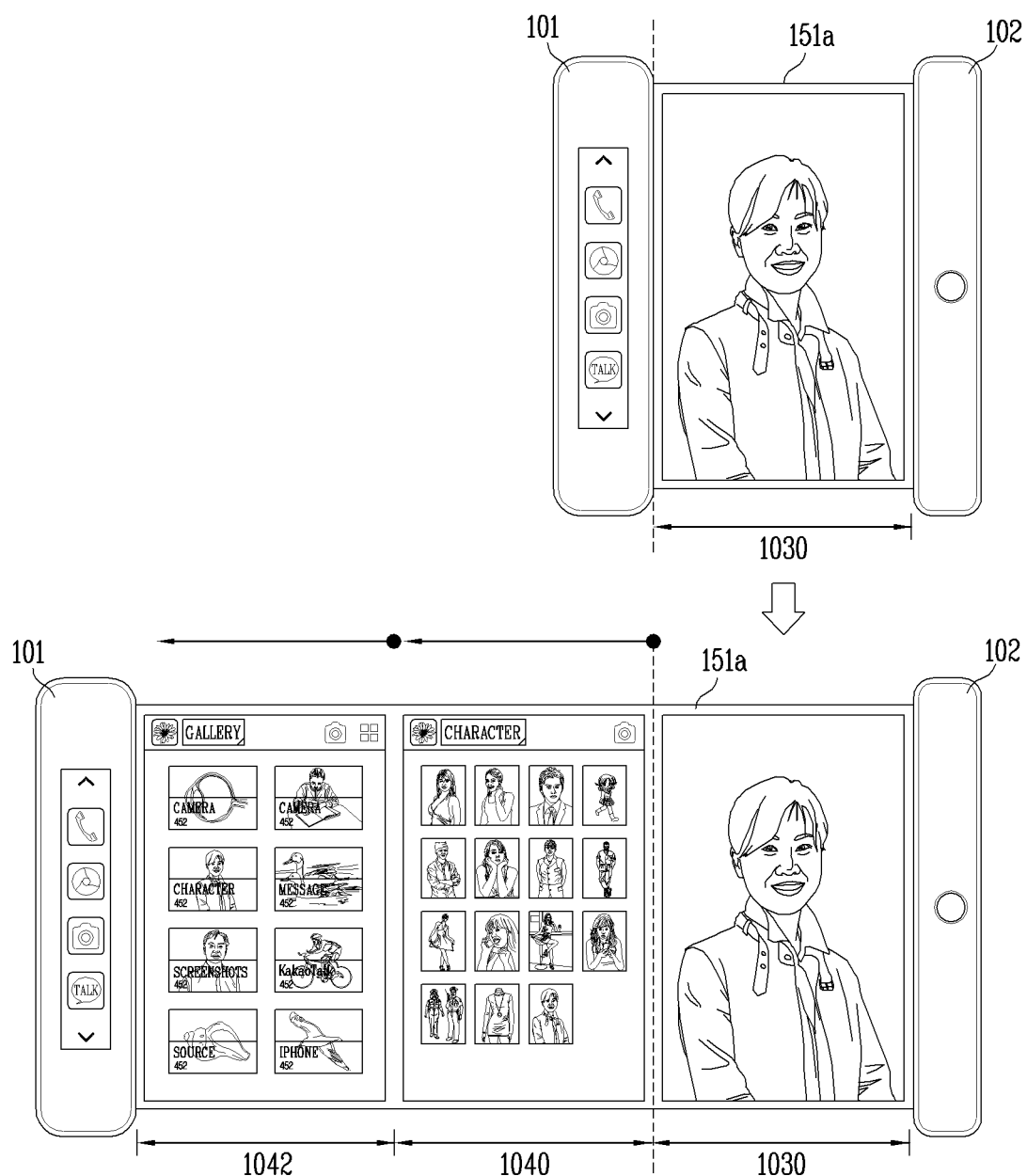

On the other hand, as illustrated in FIG. 10B, when the first type roll-out occurs while the one image is being displayed in the first region 1030 of the first touch screen 151*a*, images of the character album to which the one image belongs are displayed in a left second region 1040 of the first touch screen 151*a*, which is exposed by the roll-out. Further, when the first type roll-out occurs while the images included in the character album are displayed in the left second region 1040, the album list is displayed in a left third region 1042 of the first touch screen 151*a*, which is exposed by the roll-out. In other words, as the first type roll-out of occurs, a higher function is executed based on screen information which is being displayed.

FIGS. 11A and 11B are views illustrating operations when a roll-out occurs while an execution screen of a phone application is being output.

The execution screen of the phone application includes a keypad configured to receive a phone number. When touches are applied to the keypad, a phone number corresponding to the touches is displayed on the execution screen. When a virtual call button is touched, a call is made to the phone number which is being displayed on the execution screen.

Meanwhile, the roll-out may occur while the execution screen of the phone application is displayed in the first region 1110 of the first touch screen 151*a*. In this case, the controller 180 may execute a different function depending on whether or not a phone number is input on the execution screen of the phone application.

For example, as illustrated in first and second drawings of FIG. 11A, a second region 1120 of the first touch screen 151*a* may be exposed by the roll-out without an input phone number. The controller 180 controls the first touch screen 151*a* to output a recent call list in the second region 1120 when the second region 1120 is exposed while the phone number is not input.

As another example, as illustrated in first and second drawings of FIG. 11B, the second region 1120 of the first touch screen 151*a* may be exposed by the roll-out in a state where a phone number has been input. In this case, the controller 180 displays information related to the phone number displayed in the first region 1110 in the second region 1120. When the phone number displayed in the first region 1110 is in the memory 170 or a server, information related to the phone number may be displayed in the second region 1120. The information related to the phone number may include a name, a birthday, an address, a memo, a counterpart image, a schedule booked with the phone number, and the like.

Meanwhile, the controller 180 may differently control information displayed in the second region 1120 as the size of the second region 1120 is changed due to the roll-out.

As illustrated in second and third drawings of FIG. 11A, even if a recent call list is displayed in the second region 1120, information included in the recent call list may be different according to the size of the second region 1120. For example, if the second region 1120 is smaller than a reference size, a predetermined graphic object (e.g., contact search) may not be displayed. However, if the second region 1120 is larger than the reference size, the predetermined graphic object may be displayed.

As illustrated in second and third drawings of FIG. 11B, even if the information related to the phone number input in the first region 1110 is displayed in the second region 1120, the displayed information may be different according to the size of the second region 1120. For example, if the second region 1120 is smaller than a reference size, detailed information related to the counterpart may be displayed. On the other hand, if the second region 1120 is larger than the reference size, a contact list related to the counterpart may be displayed.

Meanwhile, when the display region is changed in size by the roll-in or roll-out, the controller 180 may control the first touch screen 151*a* to output different screen information according to the changed size of the display region. Hereinafter, a method of performing a different control according to the changed size of the display region will be described in detail.

Figure 12:
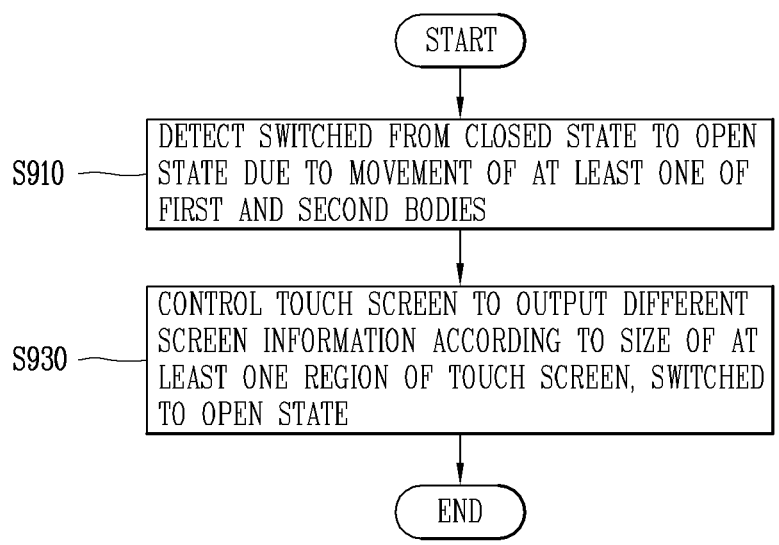
FIG. 12 is a flowchart illustrating a control method of performing different controls based on a display region in case of switching from a closed state to an open state.
Figure 13A:
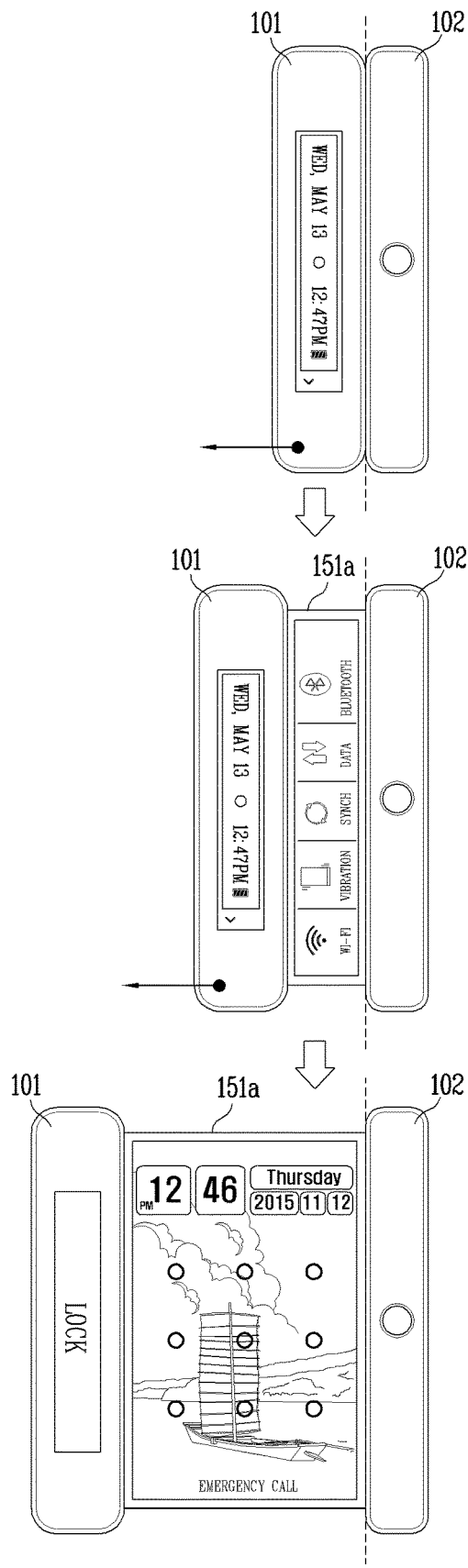
FIGS. 13A and 13B are conceptual views illustrating operations of a rollable mobile terminal according to the control method illustrated in FIG. 12.
Figure 13B:
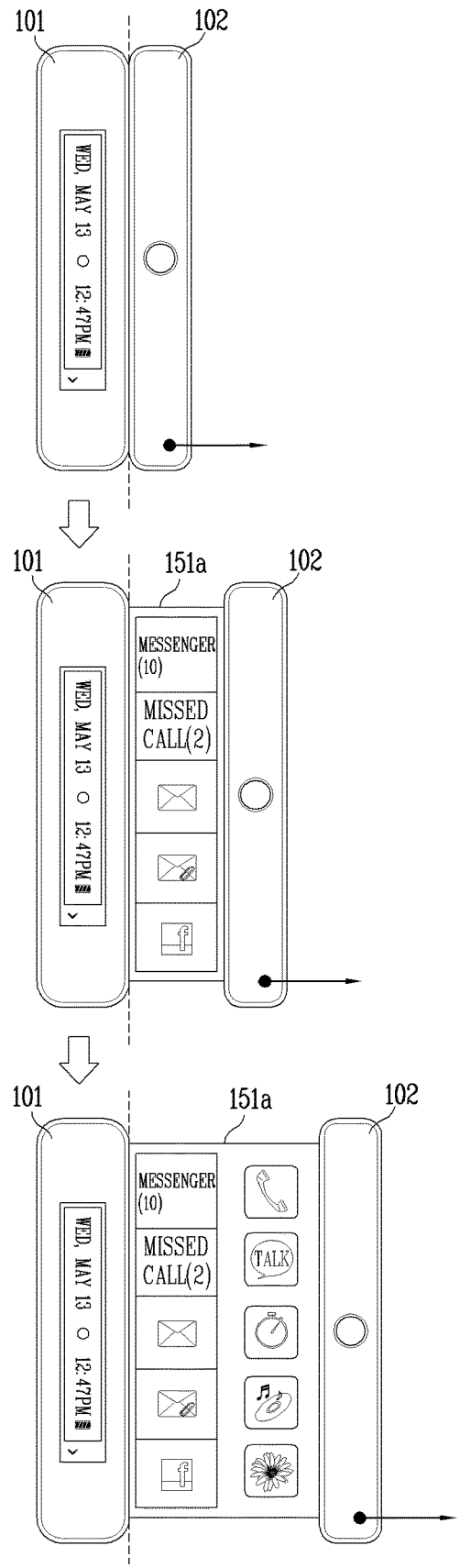

FIG. 12A is a flowchart illustrating a control method of performing a different control based on a display region when a first touch screen is switched from a closed state to an open state, and FIGS. 13A and 13B are views illustrating operations of the rollable mobile terminal according to the control method illustrated in FIG. 12.

First, the controller 180 detects that the first touch screen 151*a* is switched from the closed state to the open state by a movement of at least one of the first body 101 and the second body 102 (S910).

Next, the controller 180 controls the first touch screen 151*a* to output different screen information in at least one region of the first touch screen 151*a* switched to the open state according to a size of the at least one region (S930). The at least one region of the first touch screen 151*a* switched to the open state is set as a display region, and different screen information is displayed in the display region according to a size of the display region.

More specifically, the controller 180 controls the first touch screen 151*a* to output a predetermined number of graphic objects in the display region when the size of the display region is smaller than a reference size, while controlling the first touch screen 151*a* to display a preset home screen page in the display region when the size of the display region is larger than the reference size.

When the closed state is switched into the open state by the movement of the first body and the size of the display region switched to the open state is smaller than the reference size, the controller 180 controls the first touch screen 151*a* to display graphic objects included in a first group in the display region. On the other hand, when the closed state is switched into the open state by the movement of the second body and the size of the display region switched to the open state is smaller than the reference size, the controller 180 controls the first touch screen 151*a* to display graphic objects included in a second group in at least one region switched to the open state.

For example, as illustrated in FIG. 13A, when the closed state is switched to the open state by the first type roll-out and the display region is smaller than the reference size, the controller 180 may display the graphic objects of the first group in the display region.

Here, the graphic objects of the first group refer to graphic objects for changing setting values of the terminal or turning on/off specific functions.

When the user desires to execute a silent mode, the user may simply execute the silent mode by slightly opening the first touch screen 151a using the first type roll-out and applying a touch to a graphic object (e.g., vibration) corresponding to the silent mode.

In another example, as illustrated in FIG. 13B, when the closed state is switched to the open state by the second type roll-out and the display region is smaller than the reference size, the controller 180 may display graphic objects of a second group in the display region.

Here, the graphic objects of the second group may be icons for notifying events occurring in applications installed in the terminal. The icon may include at least one of information related to an application in which an event has occurred, details of the event, a total number of occurrences of the event.

For example, the event occurrence may be a missed call, presence of an application to be updated, a message arrival, charging, power-on or power-off of the terminal, pressing of an LCD awake key, an alarm, an incoming call, a missed notification, and the like.

As another example, when specific information is received through the wireless communication unit of the terminal, it indicates that an event has occurred in an application associated with the specific information, and the controller detects the event. Or in case where there is an item input by the user on a schedule management, when the date corresponding to the item comes, it indicates that the event has occurred in a schedule management application.

On the other hand, when the size of the display region is larger than a reference size, the controller 180 displays a preset home screen page on the display region.

The preset home screen page may be changed according to the movement of the at least one body by which the closed state is switched to the open state. For example, the preset home screen page may be a private home screen page when the first type roll-out occurs, while the preset home screen page may be a general home screen page when the second type roll-out occurs. In another example, in case where the home screen page includes a plurality of pages, the preset home screen page may be a first page when the first type roll-out occurs, while the preset home screen page may be a second page when the second type roll-out occurs.

On the other hand, the controller 180 may control the first touch screen 151a to display at least part of a first window in the display region when the size of the display region is smaller than a reference size, and to display the first window and at least part of the second window in the display region when the size of the display region is larger than the reference size. At this time, the first and second windows are displayed in different regions of the display region, and the first and second windows include different screen information.

When the first and second windows are displayed, the controller 180 detects a control command related to information displayed on the first window using a touch input applied to the first window, and detects a control command related to information displayed on the second window using a touch input applied to the second window. In other words, the first and second windows may operate as user interfaces operating independently of each other.

As described above, according to the present invention, one or more windows can be additionally displayed in the display region in response to the display region being changed in the rollable mobile terminal, and different information can be displayed in the added windows according to the type of roll-out. A different function can be executed according to a way of opening the first touch screen 151a, and different screen information can be displayed accordingly, thereby providing a new type of user convenience.

It is to be understood that the above-described rollable mobile terminal of the present invention is not limited to the configuration and the method of the embodiments described above, but all or some of the embodiments are selectively combined so that the embodiments can be modified variously.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A rollable mobile terminal, comprising:
a touch screen configured to be rollable;
a first body coupled to one end of the touch screen;
a second body connected to another end opposite to the one end of the touch screen;
a guide unit disposed on at least one of the first body and the second body to accommodate the touch screen in a rolling manner;
a memory to store first and second user accounts having different access rights to a file; and
a controller to set at least part of the touch screen, exposed to outside of the guide unit due to a movement of at least one of the first and second bodies, as a display region when the at least one of the first body and the second body is moved by an external force, and output screen information to the display region,
wherein the controller outputs different screen information in the display region based on a body, moved by the external force, of the first body and the second body,
wherein the second body implements an open state of exposing at least part of the touch screen and a closed state in which the touch screen is in contact with the first body,
wherein the controller outputs first screen information in the display region when the closed state is switched to the open state by a movement of the first body and outputs second screen information in the display region when the closed state is switched to the open state by a movement of the second body,
wherein the controller logs in the first user account and outputs as the first screen information a home screen page corresponding to the first user account when the closed state is switched to the open state by the movement of the first body, and
wherein the controller logs in the second user account and outputs as the second screen information a home screen page corresponding to the second user account when the closed state is switched to the open state by the movement of the second body.

2. The terminal of claim 1, wherein the controller outputs third screen information in the display region when the closed state is switched to the open state by a movement of the first body and the second body.

3. The terminal of claim 2, wherein the controller resets at least one of the first to third screen information, preset to be output in the display region according to the movement of the at least one body, to another screen information based on a user input.

4. The terminal of claim 1, wherein the controller executes one of functions associated with an application based on the movement of the at least one body when a second region of the touch screen is exposed by the movement of the at least one body while a first execution screen of the application is being output in a first region, and
wherein the first execution screen is displayed in the first region and a second execution screen corresponding to the one function is displayed in the second region.

5. The terminal of claim 4, wherein the controller executes a first function of the functions associated with the application when the second region is exposed by the movement of the first body, and executes a second function of the functions associated with the application when the second region is exposed by the movement of the second body.

6. The terminal of claim 5, wherein the functions associated with the application form a tree structure, the first function corresponds to a parent node based on the first execution screen, and the second function corresponds to a child node based on the first execution screen.

7. The terminal of claim 5, wherein the controller executes a third function of the functions associated with the application when the second region is exposed by the movement of the first and second bodies.

8. The terminal of claim 1, wherein the controller controls the touch screen to output different screen information according to a size of the display region when the closed state is switched to the open state by the movement of the at least one body.

9. The terminal of claim 8, wherein the controller controls the touch screen to display a predetermined number of graphic objects in the display region when the size of the display region is smaller than a reference size, and to display a preset home screen page in the display region when the size of the display region is larger than the reference size.

10. The terminal of claim 9, wherein the preset home screen page is changed according to the movement of the at least one body, by which the closed state has been switched to the open state.

11. The terminal of claim 9, wherein the controller controls the touch screen to display graphic objects included in a first group in the display region when the closed state is switched to the open state by the movement of the first body and the size of the display region switched to the open state is smaller than the reference size, and
controls the touch screen to display graphic objects included in a second group in at least one region switched to the open state when the closed state is switched to the open state by the movement of the second body and the size of the display region switched to the open state is smaller than the reference size.

12. The terminal of claim 8, wherein the controller controls the touch screen to display at least part of a first window in the display region when the size of the display region is smaller than the reference size, and to display the first window and at least part of a second window in the display region when the size of the display region is larger than the reference size, and
wherein the first and second windows are displayed in different regions of the display region and include different screen information.

13. The terminal of claim 12, wherein the controller detects a control command related to information displayed in the first window using a touch input applied to the first window, and detects a control command related to information displayed in the second window using a touch input applied to the second window.

14. The terminal of claim 1, further comprising a sensing unit to detect the movement of the at least one body, and detect the at least one region, exposed to the outside of the guide unit, of the entire region of the touch screen,
wherein the controller sets the detected at least one region as the display region in response to the movement of the at least one body.

15. The terminal of claim 1, wherein the controller,
when a second region of the touch screen is exposed by the movement of the at least one body while screen information is being output in a first region of the touch screen in the open state and the movement of the at least one body satisfies a preset condition,
controls the touch screen to display at least part of the screen information being output in the first region in the second region.

16. The terminal of claim 1, wherein the controller outputs screen information in a first region of the touch screen, and moves the screen information on the first region such that information to be output is sequentially displayed according to a direction of a preset touch applied to the touch screen, and
wherein the controller controls the touch screen such that another part, different from the part being output in the first region, of the information to be output is output in a second region of the touch screen when the second region is exposed by the movement of the at least one body.

17. The terminal of claim 1, wherein the controller, when the display region is changed from a first region to a second region due to a movement of the first and second bodies,
displays screen information displayed in the first region in the second region, and increases or decreases a size of content included in the screen information based on a size of the second region.

* * * * *